(12) United States Patent
Fujimoto et al.

(10) Patent No.: US 10,347,410 B2
(45) Date of Patent: Jul. 9, 2019

(54) COMPOSITE SMOOTHING INDUCTOR AND SMOOTHING CIRCUIT

(71) Applicant: ALPS ALPINE CO., LTD., Tokyo (JP)

(72) Inventors: Mitsunao Fujimoto, Miyagi-ken (JP); Yukio Konno, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/213,096

(22) Filed: Dec. 7, 2018

(65) Prior Publication Data
US 2019/0108939 A1 Apr. 11, 2019

Related U.S. Application Data

(63) Continuation of application No. PCT/JP2017/014081, filed on Apr. 4, 2017.

(30) Foreign Application Priority Data

Jul. 14, 2016 (JP) .................................. 2016-139564

(51) Int. Cl.
*H01F 17/04* (2006.01)
*H02M 1/14* (2006.01)
(Continued)

(52) U.S. Cl.
CPC ............. *H01F 17/04* (2013.01); *H01F 27/00* (2013.01); *H01F 27/24* (2013.01); *H01F 27/28* (2013.01);
(Continued)

(58) Field of Classification Search
CPC .......... H01F 17/04; H01F 27/00; H01F 27/24; H01F 27/28; H01F 37/00; H02M 1/14; H02M 3/155
See application file for complete search history.

(56) References Cited

U.S. PATENT DOCUMENTS 7,808,355 B2 * 10/2010 Nagano ................. H01F 27/385
323/271
7,839,255 B2 * 11/2010 Nagano ..................... H01F 3/10
323/225
2010/0176909 A1 7/2010 Yasuda et al.

FOREIGN PATENT DOCUMENTS

JP 58-53111 U 4/1983
JP 2007-184509 A 7/2007
(Continued)

OTHER PUBLICATIONS

International Search Report for corresponding International Application No. PCT/JP2017/014081, dated Jun. 27, 2017, 2 pages.
(Continued)

*Primary Examiner* — Patrick O Neill
(74) *Attorney, Agent, or Firm* — Brinks Gilson & Lione

(57) ABSTRACT

A composite smoothing inductor that can respond to an increasing demand for downsizing, a higher driving frequency, and the like has a coupling transformer, a first smoothing inductor, a second smoothing inductor on a substrate in a concentrated manner. Two input terminals are connected to the coupling transformer. One output part of the coupling transformer is connected to the first smoothing inductor, and another output part of the coupling transformer is connected to the second smoothing inductor. The first smoothing inductor and second smoothing inductor are each connected to an output terminal. The mutual inductance of the coupling transformer is higher than the self-conductance of the first smoothing inductor and the self-conductance of the second smoothing inductor.

15 Claims, 18 Drawing Sheets

(51) Int. Cl.
    *H01F 27/00*     (2006.01)
    *H01F 27/24*     (2006.01)
    *H01F 27/28*     (2006.01)
    *H01F 37/00*     (2006.01)
    *H02M 3/155*     (2006.01)

(52) U.S. Cl.
    CPC .............. *H01F 37/00* (2013.01); *H02M 1/14* (2013.01); *H02M 3/155* (2013.01)

(56) References Cited

FOREIGN PATENT DOCUMENTS

| | | |
|---|---|---|
| JP | 2009-117676 A | 5/2009 |
| JP | 2010-27758 A | 2/2010 |
| JP | 2015-115341 A | 6/2015 |
| TW | 201523657 A | 6/2015 |
| WO | WO 2015/037204 A1 | 3/2015 |

OTHER PUBLICATIONS

Taiwanese Office Action corresponding to Japanese Application No. 2015-115341, dated Sep. 5, 2017, 3 pages.

\* cited by examiner

FIG. 11
PRIOR ART
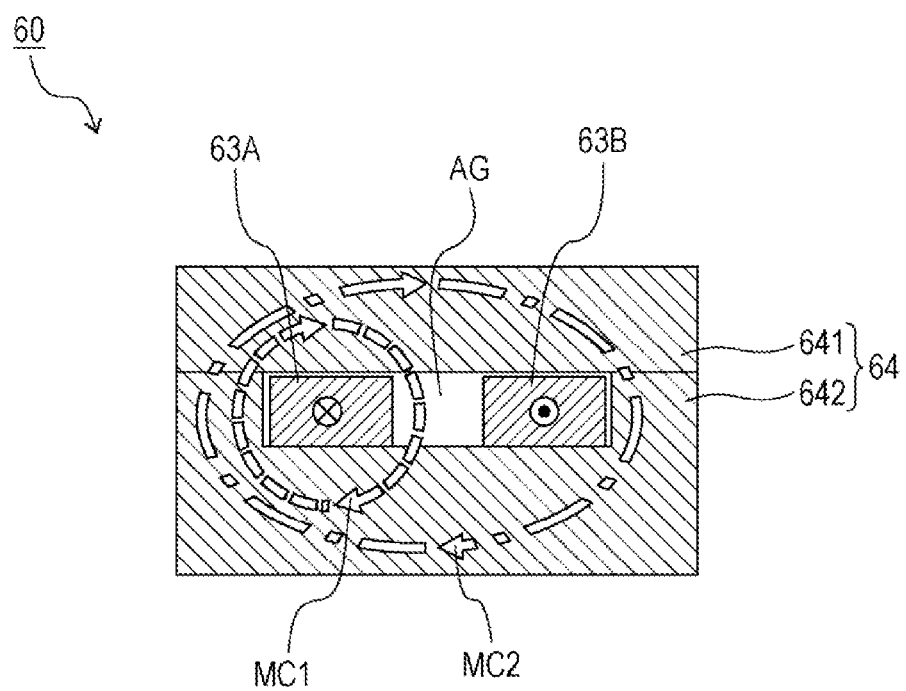
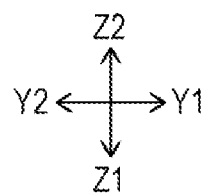

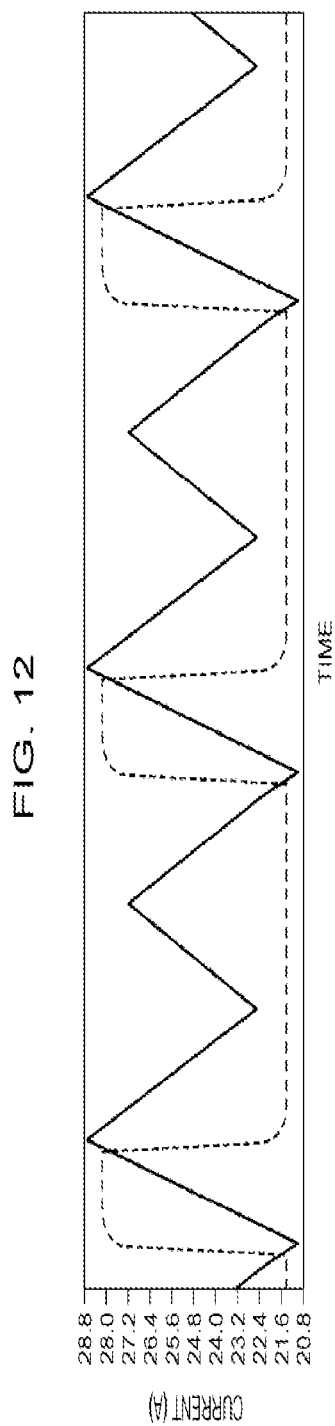

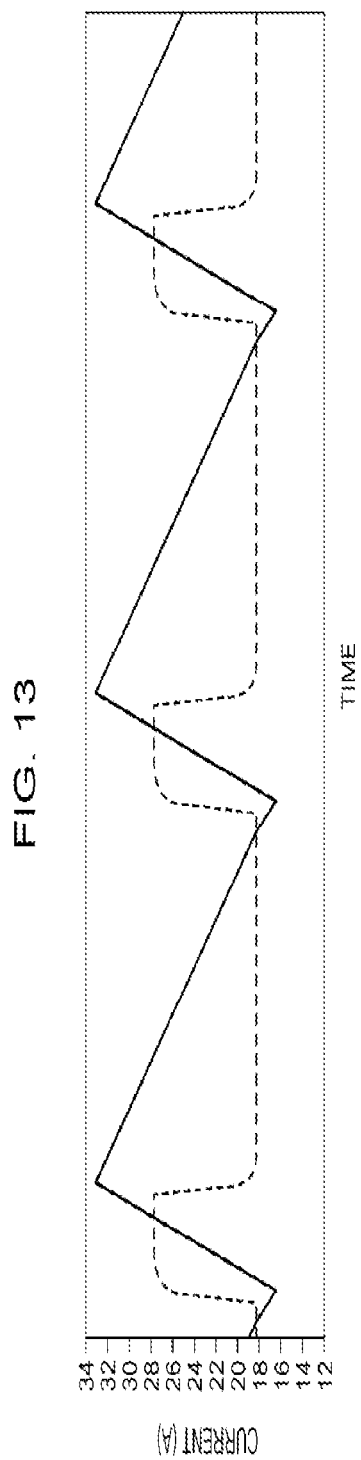

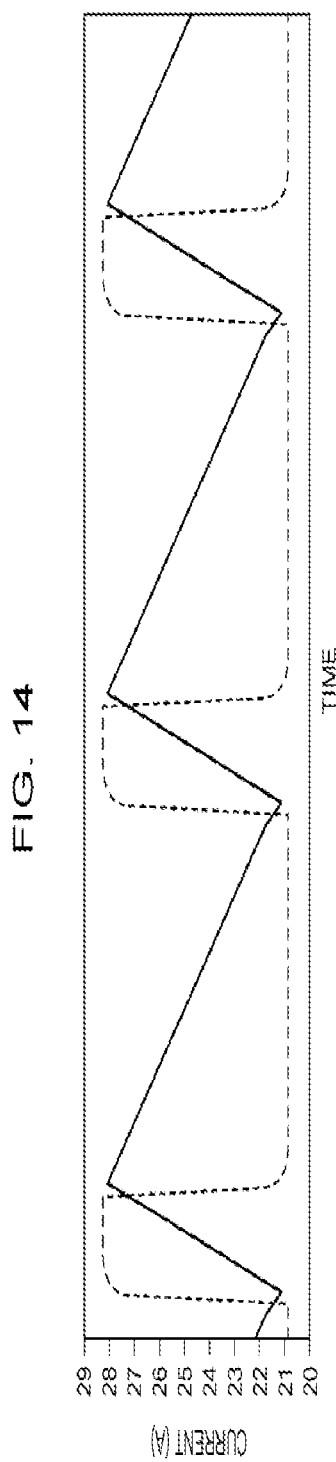

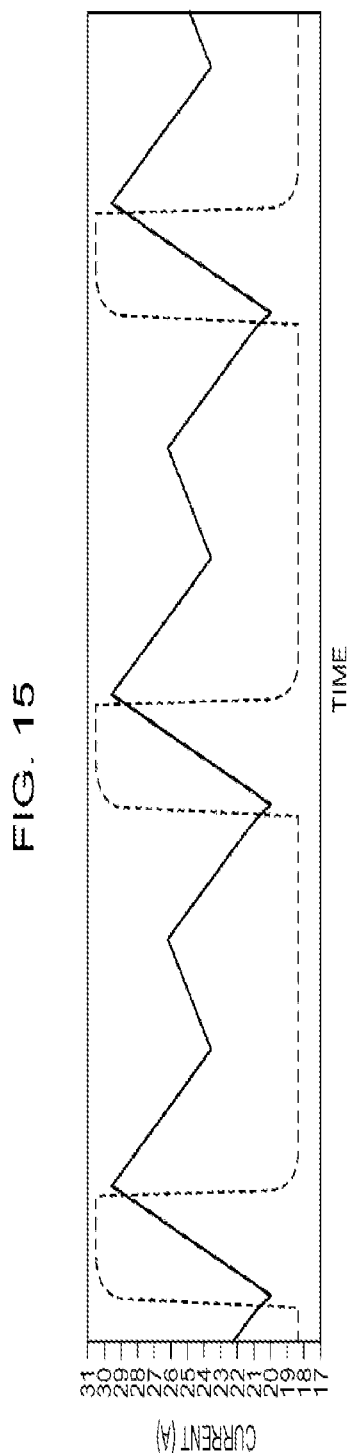

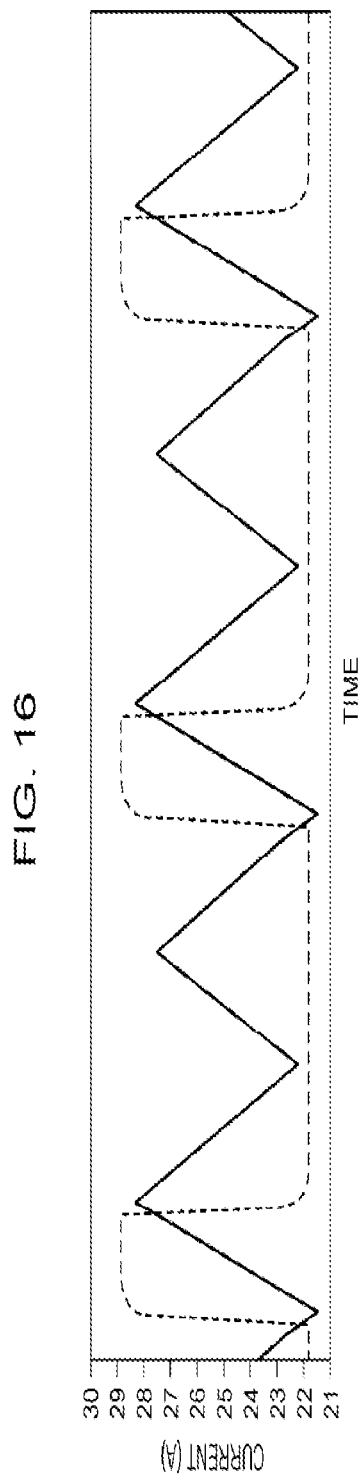

COMPOSITE SMOOTHING INDUCTOR AND SMOOTHING CIRCUIT

CLAIM OF PRIORITY

This application is a Continuation of International Application No. PCT/JP2017/014081 filed on Apr. 4, 2017, which claims benefit of priority to Japanese Patent Application No. 2016-139564 filed on Jul. 14, 2016. The entire contents of each application noted above are hereby incorporated by reference in their entireties.

BACKGROUND

1. Field of the Disclosure

The present disclosure relates to a composite smoothing inductor, and more particularly to a composite smoothing inductor used in a multi-phase DC-DC converter and a smoothing circuit having this composite smoothing inductor.

2. Description of the Related Art

Along with an increase in the amount of information processing, the amount of current required by electronic devices such as large-scale integrated (LSI) chips and other semiconductor devices has increased. Thus, multi-phase DC-DC converters are being used.

A coupled inductor used in a multi-phase DC-DC as described above is described in Japanese Unexamined Patent Application Publication No. 2009-117676; the coupled inductor has a first coil conductor and a second coil conductor, and also has a first magnetic body and a second magnetic coil that sandwich the first coil conductor and second coil conductor; the first magnetic body and second magnetic body are formed from a laminated body of metal magnetic foils; the lamination direction of the metal magnetic foils and the direction of a magnetic flux generated by the first magnetic body and second magnetic body are orthogonal to each other.

With a DC-DC converter that supplies a large current, if a large current is supplied with a single-output circuit, a load applied to a power semiconductor is increased, so a high-speed operation cannot be performed and negative effects are brought in terms of efficiency and a size. Therefore, improvement in efficiency and size has been thought by lowering a current value per output by connecting multi-output circuits in parallel (phase shift) to achieve a high-speed operation of a power semiconductor. However, a further improvement has been demanded.

As an example, when a voltage is dropped by a DC-DC converter that outputs a low-voltage large current, a current is increased at a stage behind the DC-DC converter and an energy loss is increased. Therefore, it is desirable for the DC-DC converter to be placed in the vicinity of a semiconductor such as an LSI chip. Therefore, there has been an increasing demand for a downsized DC-DC converter. To respond to this demand, a coupled inductor as described in Japanese Unexamined Patent Application Publication No. 2009-117676 has a structure in which a coupling transformer and a smoothing inductor are integrated together, as a basic structure. However, it has been essentially impossible for the coupled inductor to respond to a further increase in recent demands for the downsizing of a DC-DC converter and for a higher driving frequency.

FIG. 11 is a cross-sectional view of a coupled inductor having a structure similar to the structure of the coupled inductor disclosed in Japanese Unexamined Patent Application Publication No. 2009-117676. The coupled inductor 60 illustrated in FIG. 11 functions as a coupling transformer by magnetically coupling a first coil conductor 63A and a second coil conductor 63B together, and each of the first coil conductor 63A and second coil conductor 63B functions as a coil in a smoothing inductor. Since the coupled inductor 60 has this structure, part of a magnetic field generated by a current flowing into one of the first coil conductor 63A and second coil conductor 63B (first coil conductor 63A, for example) is inevitably used for a first magnetic circuit MC1 used as a smoothing inductor having the first coil conductor 63A.

With the coupled inductor 60, therefore, only part of the magnetic field generated by a current flowing into the first coil conductor 63A can be employed for a second magnetic circuit MC2 used to generate an induced current in the second coil conductor 63B. This leads to an essential obstacle to increasing the inductance of the coupling transformer. When the inductance of the coupling transformer is low, the induced current generated in the second coil conductor 63B is lowered and a ripple value (a current fluctuation range in the output signal) in an output signal from the DC-DC converter becomes large. Since suppression of this ripple value to a certain range (within 30% of the maximum value of the output signal, for example) is a basic requirement for the DC-DC converter, an action is required to, for example, increase the inductance of the smoothing inductor by enlarging the entire coupled inductor, so it becomes difficult to downsize the coupled inductor 60.

To lower the effective magnetic permeability of the first magnetic circuit MC1 for the smoothing inductor, an air gap AG is provided between the first coil conductor 63A and the second coil conductor 63B so that the second magnetic circuit MC2 for the coupling transformer and the first magnetic circuit MC1 for the smoothing inductor are appropriately formed according to a magnetic field generated by a pulse current supplied from a power source. A leakage magnetic field from this air gap AG becomes an obstacle to the downsizing of the coupling transformer. In particular, when the driving frequency becomes high, a loss based on the leakage magnetic field becomes large and a problem of heat generation or the like becomes prominent, making it impossible to further downsize the coupling transformer.

SUMMARY

The present invention provides a composite smoothing inductor that can respond to increasing demands for downsizing, a higher driving frequency, and the like, and also provides a smoothing circuit having the composite smoothing inductor.

In one aspect, the present disclosure provides a composite smoothing inductor characterized by having one coupling transformer having two input parts and two output parts, a first smoothing inductor having one input part and one output part, a second smoothing inductor having one input part and one output part, two input terminals, and one output terminal on one substrate in a concentrated manner, and also characterized in that: one of the two input terminals is connected to one of the two input parts of the coupling transformer, and the other of the two input terminals is connected to the other of the two input parts of the coupling transformer; one of the two output parts of the coupling transformer is connected to the input part of the first smoothing inductor, and the other of the two output parts of the coupling transformer is connected to the input part of the second smoothing inductor; the output part of the first smoothing inductor and the output part of the second smoothing inductor are each connected to the one output terminal; and the mutual inductance of the coupling transformer is higher than the self-conductance of the first smoothing inductor and the self-conductance of the second smoothing inductor.

When one coupling transformer and two smoothing inductors are separately formed as described above, it becomes possible to separately pursue a structure to enhance a function used as a coupling transformer and a structure to enhance a function used as a smoothing inductor. As a result, in spite of the coupling transformer and smoothing inductors being separate bodies, it becomes possible to form a composite smoothing inductor that can respond to increasing demands for downsizing and a higher driving frequency when compared with a coupled inductor in which a coupling transformer and a smoothing inductor are integrated together. When the mutual inductance of the coupling transformer is so as to be higher than the self-inductance of the first smoothing inductor and the self-inductance of the second smoothing inductor, the ripple value of an output signal from a DC-DC converter having the composite smoothing inductor can be easily reduced.

As another aspect, the present disclosure provides a smoothing circuit that has a first switching element, a second switching element, the composite smoothing inductor according to the above aspect of the present invention, and a capacitor. The smoothing circuit is characterized in that a pulse signal output from the first switching element is connected to one of the two input terminals of the composite smoothing inductor so that the pulse signal can be input and a pulse signal output from the second switching circuit is connected to the other of the two input terminals of the composite smoothing inductor so that the pulse signal can be input and that the capacitor is connected to the one output terminal of the composite smoothing inductor and a smoothed signal can be output from an output part provided between the capacitor and the one terminal of the composite smoothing inductor. When the composite smoothing inductor according to the above aspect of the present invention is used, it becomes easy to downsize a smoothing inductor and to increase a driving frequency while appropriately suppressing a ripple in an output signal from a DC-DC converter.

The present invention provides a composite smoothing inductor that can respond to demands for downsizing, a higher driving frequency, and the like, and also provides a smoothing circuit that uses the composite smoothing inductor.

BRIEF DESCRIPTION OF THE DRAWINGS

FIG. 11 is a cross-sectional view of the coupled inductor illustrated in FIG. 7 as taken along line XI-XI;

FIG. 12 illustrates an output signal in simulation result 1 together with an input signal;

FIG. 13 illustrates an output signal in simulation result 2 together with an input signal;

FIG. 14 illustrates an output signal in simulation result 3 together with an input signal;

FIG. 15 illustrates an output signal in simulation result 4 together with an input signal;

FIG. 16 illustrates an output signal in simulation result 5 together with an input signal;

FIG. 20A illustrates a current (solid lines) flowing in the output part of the first smoothing inductor, a current (dashed lines) flowing in the output part of the second smoothing inductor, and the current (dotted lines), illustrated in FIG. 17B, flowing in the output part of the second smoothing inductor, the current in FIG. 17B being indicated for comparison purposes, and FIG. 20B illustrates an equivalent current (solid lines) formed from a difference between the two currents illustrated in FIG. 19A and the equivalent current (dotted lines) illustrated in FIG. 17C, the current in FIG. 17C being indicated for comparison purposes.

DESCRIPTION OF THE EXEMPLARY EMBODIMENTS

An embodiment of the present invention will be described below with reference to the drawings.

Figure 1:
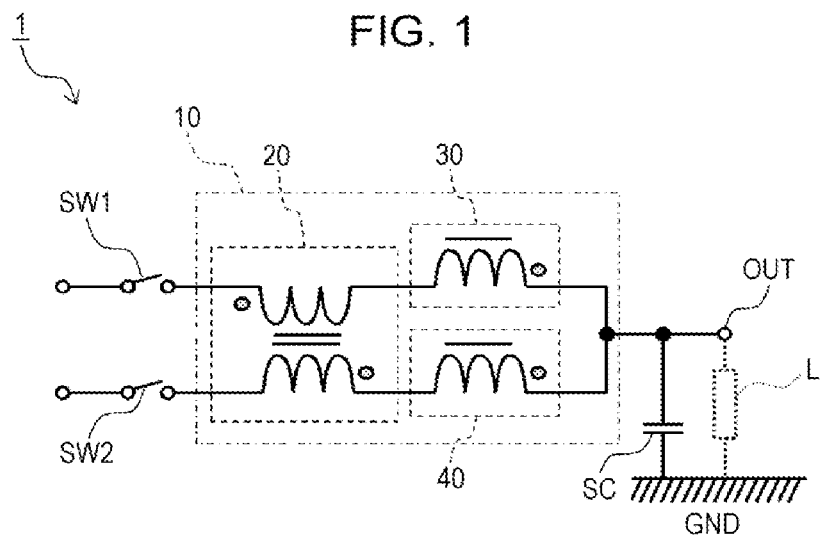
FIG. 1 is a circuit diagram of a smoothing circuit according to an embodiment of the present invention.

FIG. 1 is a circuit diagram of a smoothing circuit according to an embodiment of the present invention. As illustrated in FIG. 1, the smoothing circuit 1 has a first switching element SW1, a second switching circuit SW2, a composite smoothing inductor 10, and a capacitor SC. Signals the voltage of which is to be dropped are input into the first switching element SW1 and second switching circuit SW2 from a power source, a transistor, or the like. A pulse signal output from the first switching element SW1 is connected to one of two input terminals of the composite smoothing inductor 10 so that the pulse signal can be input. Similarly, a pulse signal output from the second switching circuit SW2 is connected to the other of the two input terminals of the composite smoothing inductor 10 so that the pulse signal can be input. The structure, functions, and the like of the composite smoothing inductor 10 will be described later.

The capacitor SC is connected to one output terminal of the composite smoothing inductor 10. A smoothed signal can be output from an output part OUT provided between the capacitor SC and the one terminal of the composite smoothing inductor 10. In FIG. 1, a state is illustrated in which a load L (indicated by dotted lines) is connected to the output part OUT and the capacitor SC and load L are both connected to ground.

The composite smoothing inductor 10 has a coupling transformer 20 and two smoothing inductors (first smoothing inductor 30 and second smoothing inductor 40), as illustrated in FIG. 1. When, for example, the first switching element SW1 operates and a pulse signal is input into the composite smoothing inductor 10, the signal is first input into the coupling transformer 20, after which an induced current flows into a circuit including the second smoothing inductor 40. As a result, currents flow out of both the first smoothing inductor 30 and the second smoothing inductor 40 and a smoothed signal is output from the output part OUT.

Figure 2:
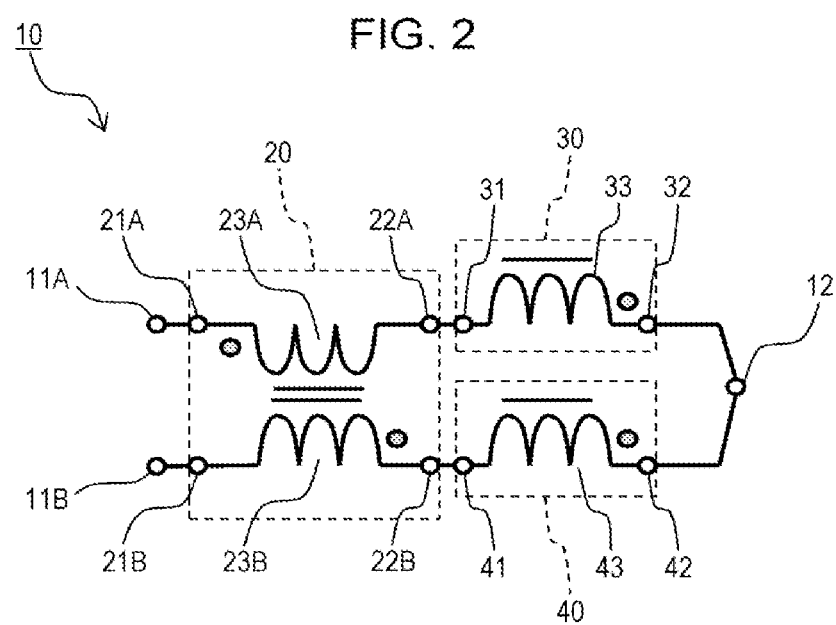
FIG. 2 is a circuit diagram illustrating the structure of a composite smoothing inductor according an embodiment of the present invention.

FIG. 2 is a circuit diagram illustrating the structure of the composite smoothing inductor according an embodiment of the present invention. As illustrated in FIGS. 1 and 2, the composite smoothing inductor 10 has one coupling transformer 20 and two smoothing inductors (first smoothing inductor 30 and second smoothing inductor 40) and further has two input terminals 11A and 11B and one output terminal 12.

The coupling transformer 20 has two input parts, 21A and 21B, and two output parts, 22A and 22B. The input terminal 11A of the composite smoothing inductor 10 is connected to the input part 21A of the coupling transformer 20, and the input terminal 11B of the composite smoothing inductor 10 is connected to the input part 21B of the coupling transformer 20. The coupling transformer 20 has a first transformer coil 23A between the input part 21A and the output part 22A and also has a second transformer coil 23B between the input part 21B and the output part 22B.

The first transformer coil 23A and second transformer coil 23B are placed so as be magnetically coupled to each other, and they have mutually opposite polarities. Therefore, when a current flows into the first transformer coil 23A, from the input part 21A to the output part 22A, an induced current generated in the second transformer coil 23B according to this current can also flow from the input part 21B toward the output part 22B. Similarly, when a current flows into the second transformer coil 23B, from the input part 21B to the output part 22B, an induced current generated in the first transformer coil 23A according to this current can also flow from the input part 21A toward the output part 22A. That is, even though either of the first switching element SW1 and second switching circuit SW2 is turned on and a current flows into the input part 21A or 21B of the coupling transformer 20, whichever is appropriate, currents can flow out of both the output parts 22A and 22B. However, a shift in time is caused between a timing at which a current starts to flow according to the on-operation of the first switching element SW1 or second switching circuit SW2 and a timing at which an induced current generated by the current starts to flow.

The first smoothing inductor 30 has an input part 31 and an output part 32 and also has a first inductor coil 33 between them. Since the input part 31 of the first smoothing inductor 30 is connected to the output part 22A of the coupling transformer 20, a current that has flowed out of the output part 22A of the coupling transformer 20 flows from the input part 31 of the first smoothing inductor 30 into the first inductor coil 33 and energy is accumulated. Then, when the flow of the current into the input part 31 of the first smoothing inductor 30 is reduced, the accumulated energy is released, a current flowing from the first inductor coil 33 into the output part 32 is increased, and a current flows from the output part 32 of the first smoothing inductor 30 into the output terminal 12 of the composite smoothing inductor 10.

The second smoothing inductor 40 has an input part 41 and an output part 42 and also has a second inductor coil 43 between them. Since the input part 41 of the second smoothing inductor 40 is connected to the output part 22B of the coupling transformer 20, a current that has flowed out of the output part 22B of the coupling transformer 20 flows from the input part 41 of the second smoothing inductor 40 into the second inductor coil 43 and energy is accumulated. Then, when the flow of the current into the input part 41 of the second smoothing inductor 40 is reduced, the accumulated energy is released, a current flowing from the second inductor coil 43 into the output part 42 is increased, and a current flows from the output part 42 of the second smoothing inductor 40 into the output terminal 12 of the composite smoothing inductor 10.

Since, as described above, there is a shift in time between a timing at which a current starts to flow according to the on-operation of the first switching element SW1 or second switching circuit SW2 and a timing at which an induced current generated by the current starts to flow, a shift in time also occurs between a timing at which a current flowing in the output part 32 of the first smoothing inductor 30 starts to flow and a timing at which a current flowing in the output part 42 of the second smoothing inductor 40 starts to flow. Therefore, it is possible to make a difference between timings at which these currents flow into the output terminal 12 of the composite smoothing inductor 10, the output terminal 12 being connected to the output part 32 of the first smoothing inductor 30 and to the output part 42 of the second smoothing inductor 40. Therefore, when the switching operation of the first switching element SW1 and the switching operation of the second switching circuit SW2 are repeated, it becomes possible to smooth the current value of the output signal.

If the mutual inductance of the coupling transformer 20 is high, an induced current easily flows, enabling the signal output from the composite smoothing inductor 10 to be smoother. Specifically, the ripple of the output signal can be reduced. Therefore, if the mutual inductance of the coupling transformer 20 is high and an induced current is appropriately generated, the self-inductances of the two smoothing inductors (first smoothing inductor 30 and second smoothing inductor 40) can be made relatively low.

In the composite smoothing inductor 10 according to an embodiment of the present invention, the coupling transformer 20 and two smoothing inductors (first smoothing inductor 30 and second smoothing inductor 40) are separately formed as described above. For the coupling transformer 20, therefore, it is possible to set a constitution in terms of a structure and a composition so that the mutual inductance is increased. At the same time, for the two smoothing inductors (first smoothing inductor 30 and second smoothing inductor 40), it is possible to set a constitution that adjusts a self-inductance completely independently of the coupling transformer 20. Therefore, if the mutual inductance of the coupling transformer 20 is adequately high, in a range in which the self-inductances of the two smoothing inductors (first smoothing inductor 30 and second smoothing inductor 40) are allowed, these smoothing inductors can be downsized.

Since, in the composite smoothing inductor 10 according to an embodiment of the present invention, the coupling transformer 20 and two smoothing inductors (first smoothing inductor 30 and second smoothing inductor 40) are separately formed, their structures and materials can be set individually to downsize the composite smoothing inductor 10.

In contrast to this, in coupled inductors described in Japanese Unexamined Patent Application Publication No. 2009-117676 and the like, a coupling transformer and a smoothing inductor are integrated together, so there is a case in which it is demanded to meet mutually contradictory requirements to pursue downsizing. Therefore, it cannot be said that further downsizing of these coupled inductors is easy.

For example, it is preferable for the mutual inductance of a coupling transformer to be high as described above. When a coupled inductor is used, however, the magnetic field generated by a current that has flowed from an external power supply to one coil cannot be completely employed as a magnetic field used to generate an induced current in another coil. As illustrated in FIG. 11, in addition to the second magnetic circuit MC2 for the coupling transformer, the first magnetic circuit MC1 for the smoothing inductor needs to be formed. In the case of a coupled inductor, therefore, there is a limit to the extent to which the mutual inductance of the coupling transformer is increased.

Figure 3:
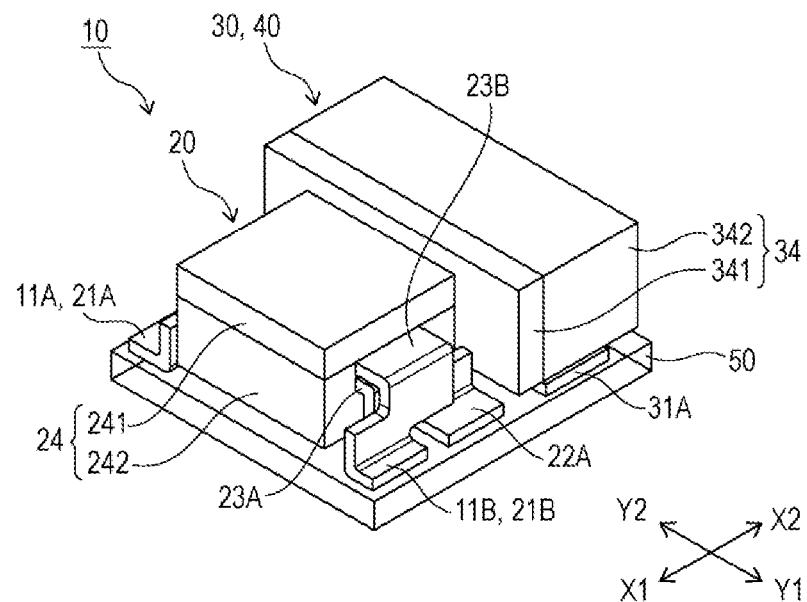
FIG. 3 is a perspective view illustrating the structure of the composite smoothing inductor according an embodiment of the present invention, the view being from a coupling transformer side.
Figure 4:
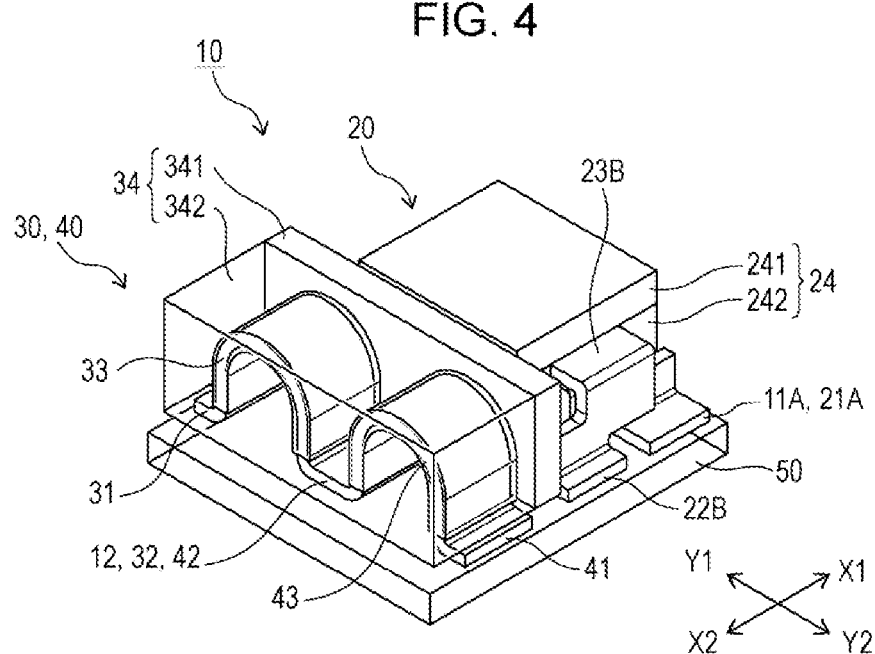
FIG. 4 is a perspective view illustrating the structure of the composite smoothing inductor according an embodiment of the present invention, the view being from a smoothing inductor side (a portion of the smoothing inductor is a transparent view)
Figure 5:
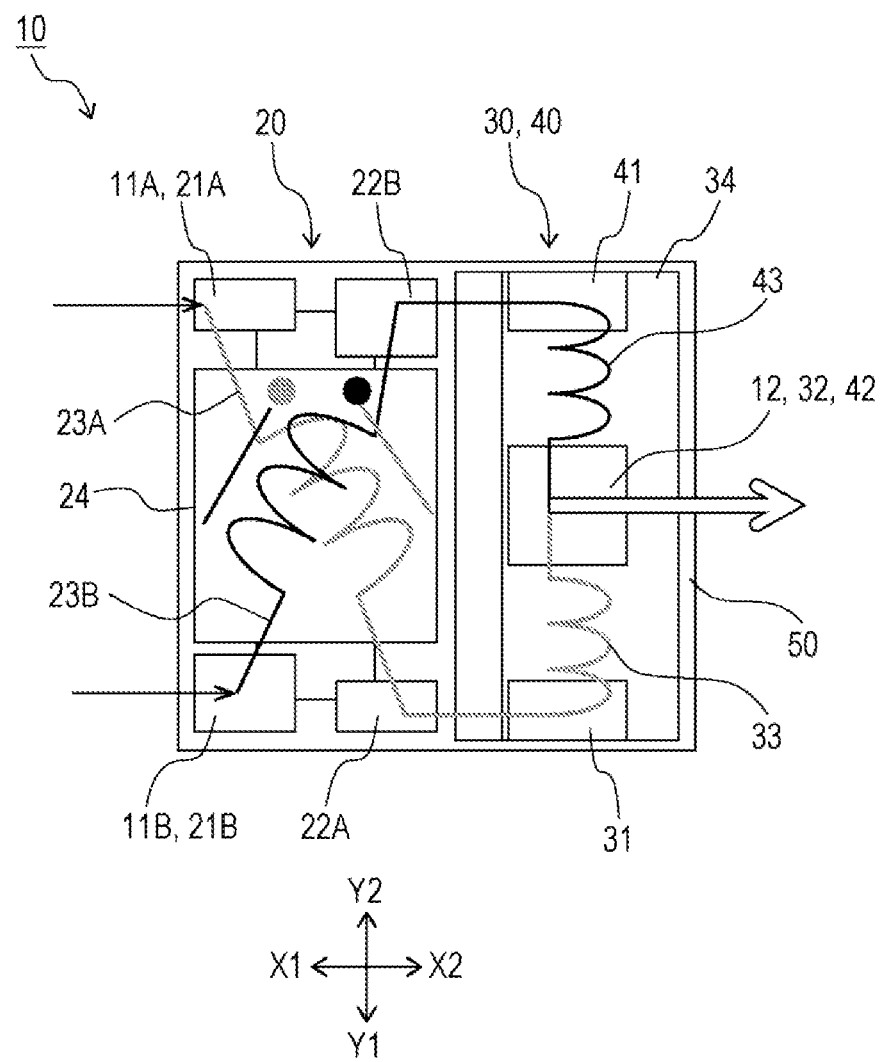
FIG. 5 conceptually illustrates the placement of four coils included in the composite smoothing inductor according an embodiment of the present invention.

FIG. 3 is a perspective view illustrating the structure of the composite smoothing inductor according an embodiment of the present invention, the view being from a coupling transformer side. FIG. 4 is a perspective view illustrating the structure of the composite smoothing inductor according an embodiment of the present invention, the view being from a smoothing inductor side. In FIG. 4, a portion of the smoothing inductor is a transparent view. FIG. 5 conceptually illustrates the placement of four coils (first transformer coil 23A, second transformer coil 23B, first inductor coil 33, and second inductor coil 43) included in the composite smoothing inductor 10 according an embodiment of the present invention.

As illustrated in FIGS. 3 to 5, in the composite smoothing inductor 10, the coupling transformer 20 and two smoothing inductors (first smoothing inductor 30 and second smoothing inductor 40) are placed on one main surface of a substrate 50 in a concentrated manner. The input terminal 11A, which is one of the two input terminals of the composite smoothing inductor 10, doubles as the input part 21A, which is one of the two input parts of the coupling transformer 20. Similarly, the input terminal 11B, which is the other of the input terminals of the composite smoothing inductor 10, doubles as the input part 21B, which is the other of the input parts of the coupling transformer 20.

In addition to the first transformer coil 23A and second transformer coil 23B, the coupling transformer 20 preferably has a transformer-use magnetic member 24, which internally includes at least part of these coils. The transformer-use magnetic member 24 illustrated in FIGS. 3 and 4 is composed of a lid part 241 and a box part 242. At least part of a member forming the first transformer coil 23A and at least part of a member forming the second transformer coil 23B are placed in the box part 242.

A portion, positioned in the transformer-use magnetic member 24, of the first transformer coil 23A and a portion, positioned in the transformer-use magnetic member 24, of the second transformer coil 23B are each preferably composed of a conductor and an insulating part that covers the conductor. These portions are preferably placed so that the insulating part of the first transformer coil 23A and the insulating part of the second transformer coil 23B come into contact with each other. As the composition of the conductor, copper, a copper alloy, aluminum, an aluminum alloy, and the like are exemplified. As the composition of the insulating part, a resin is exemplified.

Since the first transformer coil 23A and second transformer coil 23B are placed close to each other as described above, when a current flows into one of the first transformer coil 23A and second transformer coil 23B, a magnetic field generated by the current is likely to generate an induced current in the other of the first transformer coil 23A and second transformer coil 23B. That is, the mutual inductance of the coupling transformer 20 can be increased. This close placement of two transformer coils cannot be configured in a coupled inductor. Specifically, with a coupled inductor, a member forming a transformer coil needs to also function as a coil for a smoothing inductor, so if two members each of which forms a transformer are placed excessively close to each other, the self-inductance of the smoothing inductor is lowered, making it hard to form a smoothed signal by using the coupled inductor.

It is preferable to place the first transformer coil 23A and second transformer coil 23B in the coupling transformer 20 close to each other as long as they are kept insulated. Therefore, the conductive part of the first transformer coil 23A and the conductive part of the second transformer coil 23B each may have a portion that come into contact with a portion formed on the first transformer coil 23A or the second transformer coil 23B, whichever is applicable, with a member formed from an insulating material intervening between these portions.

The first transformer coil 23A and second transformer coil 23B in the coupling transformer 20 each have a crossing part; their crossing parts make one intersection in the transformer-use magnetic member 24. As illustrated in FIG. 5, the first transformer coil 23A and second transformer coil 23B cross each other once in the transformer-use magnetic member 24.

As a result of having these crossing parts, both the two input parts 21A and 21B of the coupling transformer 20 can be positioned in the vicinity of an end of the substrate 50 on the X1 side in the X1-X2 direction and the two output parts 22A and 22B of the coupling transformer 20 can be positioned closer to the X2 side in the X1-X2 direction than are the input parts 21A and 21B. That is, in the coupling transformer 20, the two input parts 21A and 21B are collectively placed on one side (X1 side in the X1-X2 direction) and the two output parts 22A and 22B are collectively placed on another side (X2 side in the X1-X2 direction). The X1-X2 direction is one of the in-plane directions on the main planes of the substrate 50 and is orthogonal to the Y1-Y2 direction, which is also one of the in-plane directions on the main planes of the substrate 50.

Figure 6:
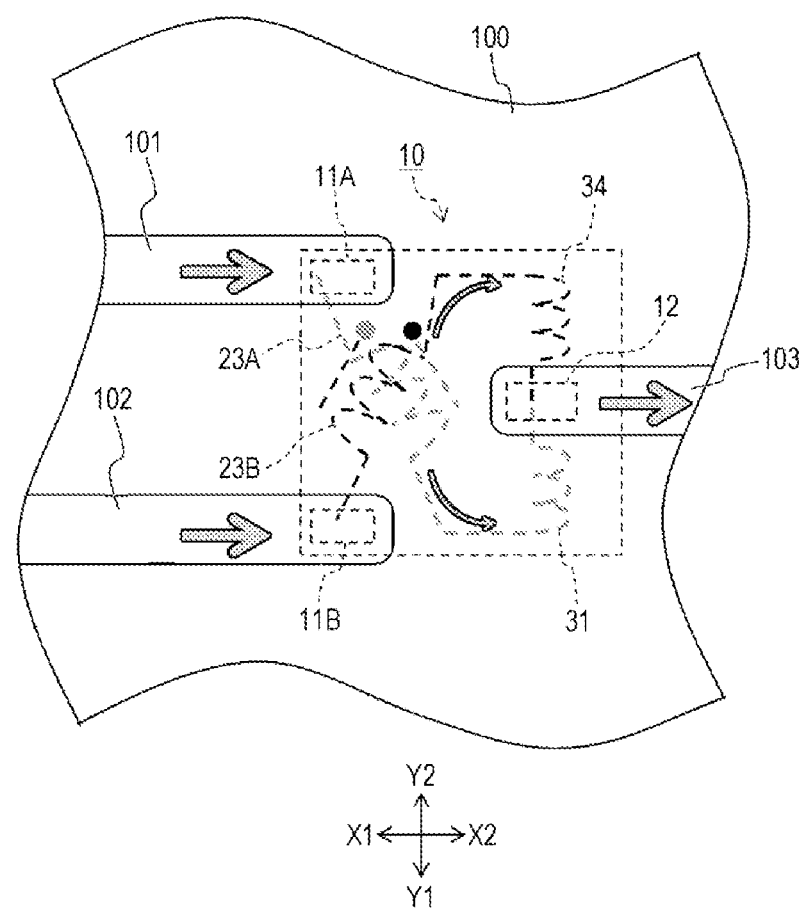
FIG. 6 conceptually illustrates the wiring structure of a circuit board on which the composite smoothing inductor according an embodiment of the present invention is placed.

This placement enables each of the two input terminals 11A and 11B of the composite smoothing inductor 10 to be positioned in the vicinity of an end on the X1 side in the X1-X2 direction, so it becomes easy to downsize the composite smoothing inductor 10 and simplify the structure of wiring on the circuit board to which the composite smoothing inductor 10 is connected. This point will be described with reference to FIG. 6. FIG. 6 conceptually illustrates the wiring structure of a circuit board on which the composite smoothing inductor according an embodiment of the present invention is placed. As illustrated in FIG. 6, in the composite smoothing inductor 10 according an embodiment of the present invention, each of the two input terminals 11A and 11B is positioned on the X1 side in the X1-X2 direction and the output terminal 12 is positioned on the X2 side in the X1-X2 direction. On a circuit board 100, on which the smoothing circuit 1 is formed, therefore, it suffices to place each of two wires, 101 and 102, which are electrically connected to the relevant output terminals of the two switching elements (first switching element SW1 and second switching circuit SW2) positioned upstream of the composite smoothing inductor 10, closer to the X1 side in the X1-X2 direction than is the composite smoothing inductor 10. On the circuit board 100, on which the smoothing circuit 1 is formed, it suffices to place a wire 103, which is electrically connected to the capacitor SC and output part OUT positioned downstream of the composite smoothing inductor 10, closer to the X2 side in the X1-X2 direction than is the composite smoothing inductor 10. As described above, the use of the composite smoothing inductor 10 enables wires, on the circuit board 100, that are connected between the composite smoothing inductor 10 and the electric elements (first switching element SW1, second switching circuit SW2, and capacitor SC) included in the smoothing circuit 1 and connected to the composite smoothing inductor 10 to have an extremely simple structure.

Since the two output parts 22A and 22B of the coupling transformer 20 are placed more toward the X2 side in the X1-X2 direction than are the input parts 21A and 21B, it becomes possible to place each of the first smoothing inductor 30 and second smoothing inductor 40 more toward the X2 side in the X1-X2 direction than is the coupling transformer 20. This placement makes it easy to downsize the composite smoothing inductor 10 becomes.

In the composite smoothing inductor 10 according to an embodiment of the present invention, the first smoothing inductor 30 and second smoothing inductor 40 are preferably integrated together as illustrated in FIGS. 3 to 5. That is, a first-inductor-use magnetic member, which internally includes at least part of the first inductor coil 33 in the first smoothing inductor 30, and a second-inductor-use magnetic member, which internally includes at least part of the second inductor coil 43 in the second smoothing inductor 40, are integrated together by an inductor-use magnetic member 34. The inductor-use magnetic member 34 is composed of a lid part 341 and a box part 342. At least part of a member forming the first inductor coil 33 and at least part of a member forming the second inductor coil 43 are placed in the box part 342.

In the composite smoothing inductor 10 according to an embodiment of the present invention, since the first smoothing inductor 30 and second smoothing inductor 40 are formed separately from the coupling transformer 20, a soft magnetic material that responds only to characteristics demanded for a smoothing inductor can be employed as the magnetic material used for the inductor-use magnetic member 34. Since a smoothing inductor is an energy accumulating element, it is preferable for the saturation magnetic flux density of the smoothing inductor to be as high as possible. A general ferrite-based soft magnetic material can be easily available as a soft magnetic material. In addition, the magnetic permeability of the ferrite-based soft magnetic material is high. In principle, therefore, the self-inductance of the smoothing inductor can be increased, but since its saturation magnetic flux density is low, it is not possible to take advantage of the high magnetic permeability without alteration. Therefore, if a ferrite-based soft magnetic material is employed as a magnetic material used for the inductor-use magnetic member 34, a structure is needed in which effective magnetic permeability is lowered by providing an air gap in the magnetic circuit. An air gap causes a leakage magnetic field. When the driving frequency is increased, this leakage magnetic field affects the wiring of the coil, increasing a loss caused by an eddy current. When this loss becomes large, heat generation or another problem becomes prominent, making it hard to downsize the smoothing inductor.

With the coupling transformer 20, however, energy transfer is more dominant than energy accumulation, so the magnetic material used for the transformer-use magnetic member 24 does not need to be a material with high saturation magnetic flux density. Therefore, by employing a ferrite-based soft magnetic material as the magnetic material used for the transformer-use magnetic member 24, it is possible to enjoy a high degree of the ease of its availability and a high level of magnetic permeability without alteration.

Thus, in the composite smoothing inductor 10 according to an embodiment of the present invention, a soft magnetic material having high saturation magnetic flux density is employed as the magnetic material (inductor-use magnetic material) used for the inductor-use magnetic member 34. As this material, an amorphous metal-based soft magnetic material and a nanocrystalline metal-based soft magnetic material are exemplified. When this material is used, it becomes easy to set the saturation magnetic flux density of the inductor-use magnetic material of the inductor-use magnetic member 34 to 700 mT or more. When the saturation magnetic flux density of the inductor-use magnetic material of the inductor-use magnetic member 34 is set to 700 mT or more, an upper limit of energy that can be accumulated in the first smoothing inductor 30 and second smoothing inductor 40 is increased, making it possible to form a smoother signal.

A soft magnetic material having lower saturation magnetic flux density than the magnetic material (inductor-use magnetic material) used for the inductor-use magnetic member 34 is employed as the magnetic material (transformer-use magnetic material) used for the coupling transformer 20. A typical example of this material is a ferrite-based soft magnetic material. The saturation magnetic flux density of a ferrite-based soft magnetic material is generally 380 mT or more and 500 mT or less, and is lower than the saturation magnetic flux density of the inductor-use magnetic material described above. In principle, however, the coupling transformer 20 is a magnetic device that does not accumulate energy, so there is no particular demand for high saturation magnetic flux density. If anything, it is important for the coupling transformer 20 to have high effective magnetic permeability. From this viewpoint, since the ferrite-based soft magnetic material can easily attain 1000 or more, it is a suitable material as the transformer-use magnetic material.

Figure 7:
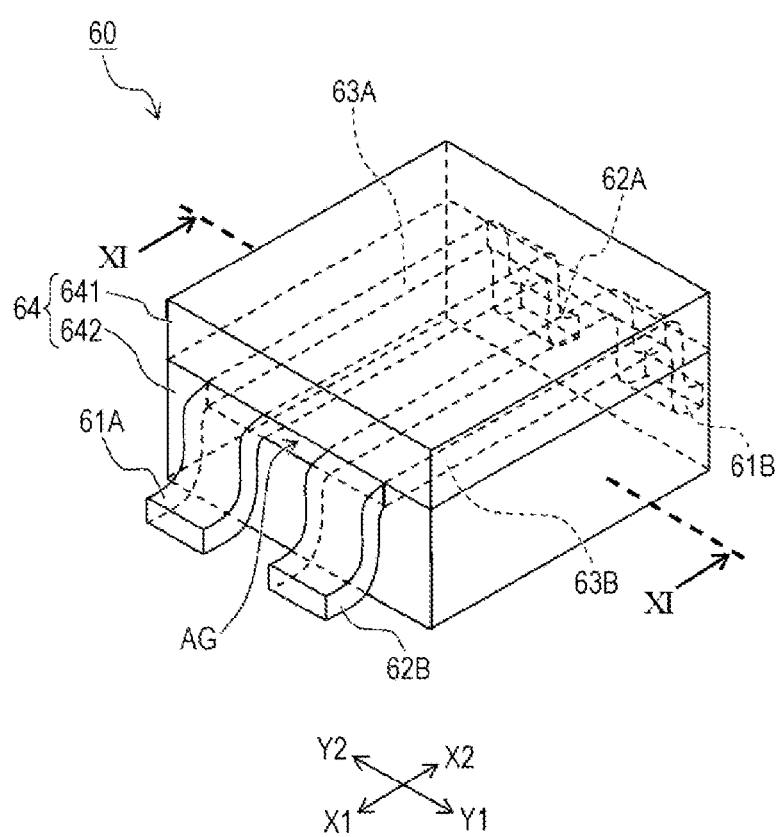
FIG. 7 is a perspective view illustrating the structure of a coupled inductor according to related art.
Figure 8:
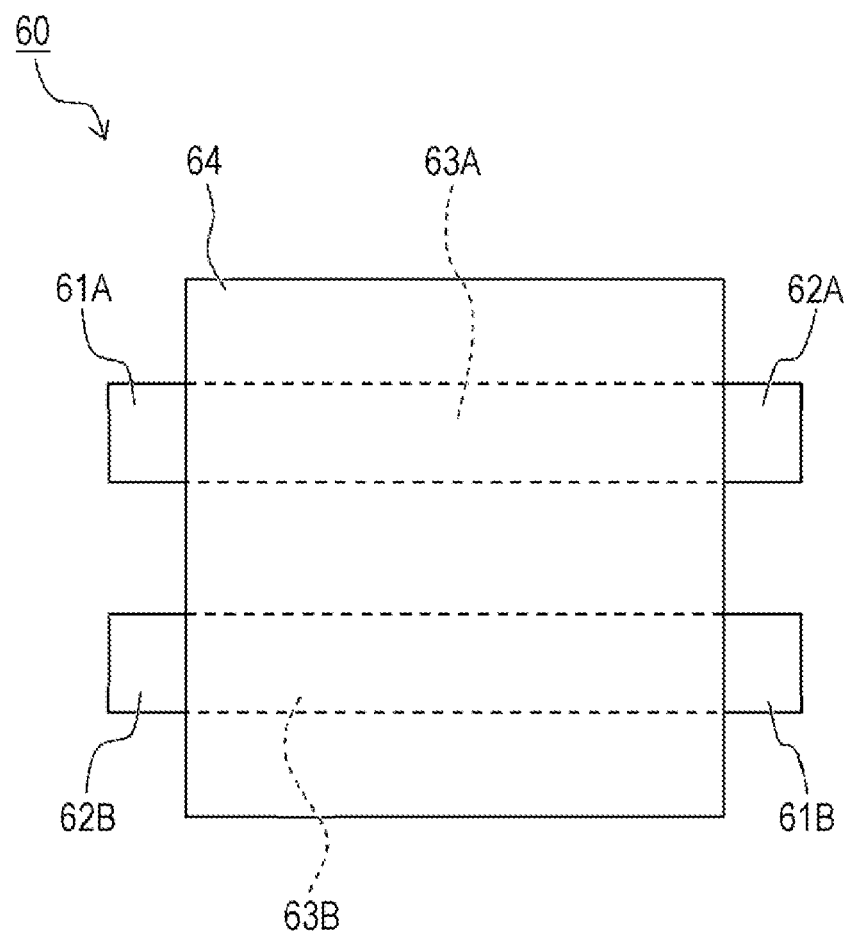
FIG. 8 is a plan view of the coupled inductor illustrated in FIG. 7.
Figure 9:
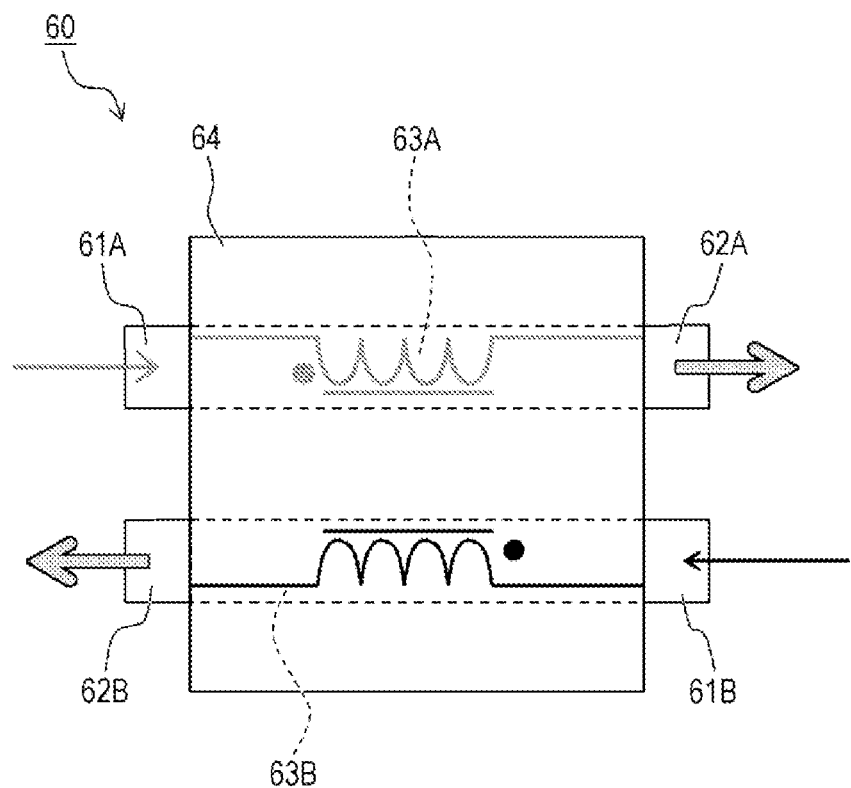
FIG. 9 conceptually illustrates the placement of two coils included in the coupled inductor illustrated in FIG. 7.
Figure 10:
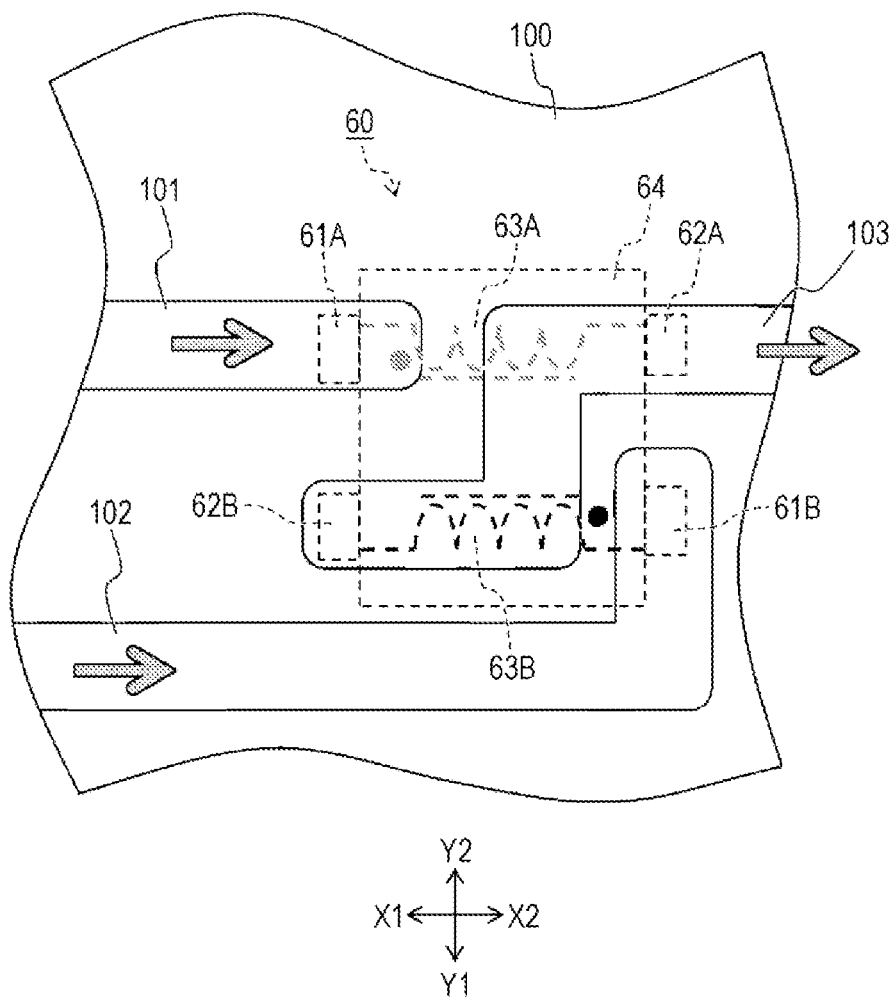
FIG. 10 conceptually illustrates the wiring structure of a circuit board on which the coupled inductor illustrated in FIG. 7 is placed.

Now, the coupled inductor according to related art will be described. FIG. 7 is a perspective view illustrating the structure of the coupled inductor according to related art. FIG. 8 is a plan view of the coupled inductor illustrated in FIG. 7. FIG. 9 conceptually illustrates the placement of two coils included in the coupled inductor illustrated in FIG. 7. FIG. 10 conceptually illustrates the wiring structure of a circuit board on which the coupled inductor illustrated in FIG. 7 is placed. FIG. 11 is a cross-sectional view of the coupled inductor illustrated in FIG. 7 as taken along line XI-XI.

As illustrated in FIG. 7, the coupled inductor 60 according to prior art has a magnetic member 64 composed of a first member 641 and a second member 642 and two conductive members. One of the conductive members is composed of a first input terminal 61A, a first output terminal 62A, and a first coil conductor 63A having a portion positioned in the magnetic member 64 between them. The other of the conductive members is composed of a second input terminal 61B, a second output terminal 62B, and a second coil conductor 63B having a portion positioned in the magnetic member 64 between them. In the magnetic member 64, an air gap AG is formed between the first coil conductor 63A and the second coil conductor 63B.

As illustrated in FIG. 8, the structure of the coupled inductor 60 is simple. The structure seems to be easy to downsize at a glance. As illustrated in FIG. 9, however, two coils placed in the magnetic member 64 have the same polarity, so the direction in which a current flows in the first coil conductor 63A and the direction in which an induced current generated in the second coil conductor 63B according to a magnetic field generated by the current flowing in the first coil conductor 63A are opposite to each other. In the coupled inductor 60, therefore, the first input terminal 61A is positioned on the X1 side in the X1-X2 direction, but the second input terminal 61B is positioned on the X2 side in the X1-X2 direction. Since the two input terminals, 61A and 61B, are oppositely placed in this way, the first output terminal 62A and second output terminal 62B are also oppositely placed. Specifically, the first output terminal 62A is placed on the X2 side in the X1-X2 direction and the second output terminal 62B is placed on the X1 side in the X1-X2 direction.

Since the two conductive members are oppositely placed as described above, the wiring structure of the circuit board on which the coupled inductor 60 is placed becomes complex when compared with the composite smoothing inductor 10 according to an embodiment of the present invention. Specifically, if the coupled inductor 60 is placed on the circuit board 100, on which the smoothing circuit 1 is formed, instead of the composite smoothing inductor 10, the wire 101 connected to the first input terminal 61A of the coupled inductor 60 can be placed as when the composite smoothing inductor 10 is used, as illustrated in FIG. 10. However, the wire 102 connected to the second input terminal 61B is placed so as to extend from the X1 side in the X1-X2 direction toward the X2 side in the X1-X2 direction while bypassing the second output terminal 62B, after which the second input terminal 61B is placed so as to be bent toward the Y2 side in the Y1-Y2 direction and to extend to a position at which the wire 102 can be connected to the second input terminal 61B. On the circuit board 100, on which the smoothing circuit 1 has been formed, the wire 103 electrically connected to the capacitor SC and output part OUT, which are positioned downstream of the composite smoothing inductor 10, needs to be electrically connected to the second output terminal 62B positioned on the X1 side in the X1-X2 direction and to the first output terminal 62A positioned on the X2 side in the X1-X2 direction. Therefore, the wire 103 has a crank-like portion as illustrated in FIG. 10. Thus, the wire 102 becomes relatively long, so the wire 103 needs to have a complex shape. Therefore, when the coupled inductor 60 is used instead of the composite smoothing inductor 10, it becomes difficult to downsize the smoothing circuit 1.

Since the coupled inductor 60 has a structure in which the function of a coupling transformer and the function of a smoothing inductor are implemented by a single member, this structure is also an obstacle to downsizing. As illustrated in FIG. 11, when a current flows in the first coil conductor 63A, a magnetic field is generated around the current. Part of the magnetic field becomes the first magnetic circuit MC1, which turns only around the first coil conductor 63A, and another part becomes the second magnetic circuit MC2, which turns around the first coil conductor 63A and second coil conductor 63B. In consideration of a distance from the first coil conductor 63A and the lengths of these magnetic circuits, the magnetic resistance of the first magnetic circuit MC1 is lower than the magnetic resistance of the second magnetic circuit MC2. Therefore, the magnetic flux density of the first magnetic circuit MC1 becomes higher than the magnetic flux density of the second magnetic circuit MC2. As described above, to make it easy to reduce the ripple value of the output signal from the smoothing circuit 1, it is desirable for the coupling transformer to have high mutual inductance. To meet this demand, the magnetic flux density of the second magnetic circuit MC2 needs to be made high. In the coupled inductor 60, adjustment is appropriately made so that the magnetic flux density is made high by forming the air gap AG in the first magnetic circuit MC1 to increase the magnetic resistance of the first magnetic circuit MC1, relatively lowering the magnetic resistance of the second magnetic circuit MC2 and thereby increasing the magnetic flux density of the second magnetic circuit MC2.

When the air gap AG is formed in the first magnetic circuit MC1 related to the smoothing inductor, the effective magnetic permeability of the magnetic member constituting the first magnetic circuit MC1 is lowered. This is advantageous for the smoothing inductor, which is an energy accumulating element. However, since the air gap AG generates a leakage magnetic field and causes a problem of an increase in loss and the like as described above, there is a limit to the extent to which the function of the smoothing inductor is enhanced by lowering the effective magnetic permeability with the air gap AG. Therefore, although a ferrite-based soft magnetic material has the advantage that it is superior in easy availability and has high magnetic permeability, if a ferrite-based soft magnetic material is employed as a magnetic material used for the magnetic member 64 in the coupled inductor 60, to fully fulfill the function of the smoothing inductor as an energy accumulating element, the volume of the magnetic member constituting the first magnetic circuit MC1 needs to be increased due to the dominant effect of the low saturation magnetic flux density of the ferrite-based soft magnetic material. This means that even though a ferrite-based soft magnetic material, which is superior in easy availability as a magnetic material used for the magnetic member and has high magnetic permeability, is used, there is a limit to the extent to which the coupled inductor 60 is downsized.

As illustrated in FIG. 4, in the box part 342, the member constituting the first inductor coil 33 is integrated with the member constituting the output part 32 of the first smoothing inductor 30, and the member constituting the second inductor coil 43 is integrated with the member constituting the output part 42 of the second smoothing inductor 40. In this structure, the first smoothing inductor 30 and second smoothing inductor 40 are placed side by side in the Y1-Y2 direction. Specifically, the first smoothing inductor 30 is positioned relatively on the Y1 side in the Y1-Y2 direction and the second smoothing inductor 40 is positioned relatively on the Y2 side in the Y1-Y2 direction. The first smoothing inductor 30 and second smoothing inductor 40 is preferably placed side by side along a first direction (Y1-Y2 direction), which is one of the in-plane directions on the main planes of the substrate 50, and the coupling transformer 20 and a group of smoothing inductors composed of the first smoothing inductor 30 and second smoothing inductor 40 are preferably placed along a second direction crossing the first direction in the main planes of the substrate 50 as described above. In this placement, the composite smoothing inductor 10 can be downsized. When the first direction and second direction are orthogonal to each other (specifically, by taking the X1-X2 direction as the second direction), it becomes possible to particularly reduce the area of the main plane of the substrate 50 of the composite smoothing inductor 10.

In the box part 342 of the inductor-use magnetic member 34, the first inductor coil 33 and second inductor coil 43 each have a semicircular shape when viewed in the X1-X2 direction, as illustrated in FIG. 4. Two input parts, 31 and 41, are positioned at both end sides of a combination of the two semicircles placed side by side, one at each end. Two output parts, 32 and 42, are positioned between the two semicircles. This placement appropriately restrains the magnetic field generated in the first smoothing inductor 30 and the magnetic field generated in the second smoothing inductor 40 to be combined in spite of the first-inductor-use magnetic member and second-inductor-use magnetic member being integrated together.

When the composite smoothing inductor 10 is viewed from the X2 side in the X1-X2 direction, a current flows from the Y1 side in the Y1-Y2 direction toward the Y2 side in the Y1-Y2 direction in the first inductor coil 33 of the first smoothing inductor 30 and a current flows from the Y2 side in the Y1-Y2 direction toward the Y1 side in the Y1-Y2 direction in the second inductor coil 43 of the second smoothing inductor 40. Therefore, a magnetic field generated by a flow of a current into the first smoothing inductor 30 becomes a reflux magnetic field oriented to the X2 side in the X1-X2 direction in the vicinity of the output part 32 of the first smoothing inductor 30. In contrast to this, a magnetic field generated by a flow of a current into the second smoothing inductor 40 becomes a reflux magnetic field oriented to the X1 side in the X1-X2 direction in the vicinity of the output part 42 of the second smoothing inductor 40.

Accordingly, these magnetic fields are oppositely oriented in the vicinity of the output terminal 12 (that is, in the vicinity of the output part 32 of the first smoothing inductor 30 and the output part 42 of the second smoothing inductor 40) and are cancelled, restraining the magnetic field generated in the first smoothing inductor 30 and the magnetic field generated in the second smoothing inductor 40 from being magnetically combined. Therefore, the composite smoothing inductor 10 according to an embodiment of the present invention can stabilize the operations of both the first smoothing inductor 30 and the second smoothing inductor 40 in spite of having a structure in which the first-inductor-use magnetic member and second-inductor-use magnetic member are integrated together.

In the composite smoothing inductor 10 according to an embodiment of the present invention, effective magnetic permeability set for the transformer-use magnetic member 24 is higher than the effective magnetic permeability of the inductor-use magnetic member 34. As a specific example, the effective magnetic permeability of the transformer-use magnetic member 24 is preferably 1000 or more and 3500 or less. The effective magnetic permeability of the inductor-use magnetic member 34 is preferably 15 or more and 120 or less. The ratio of the effective magnetic permeability of the transformer-use magnetic member 24 to the effective magnetic permeability of the inductor-use magnetic member 34 is preferably 10 or more and 200 or less and more preferably 20 or more and 100 or less. Due to these settings, it becomes possible to form a smoothed signal with a reduced ripple without having to enlarge the sizes of the first smoothing inductor 30 and second smoothing inductor 40, which are each an energy accumulating element. That is, when the above structure in relation to effective magnetic permeability is used, it becomes easy to downsize the composite smoothing inductor 10.

In contrast to this, with the coupled inductor 60, since it is necessary to increase the magnetic resistance of the first magnetic circuit MC1 involved in a smoothing inductor by using the air gap AG, if demands for downsizing and for a high driving frequency are increased, a problem caused by the presence of the air gap AG becomes an obstacle and it becomes difficult to respond to the above demands as described above.

Since, in the composite smoothing inductor 10 according to an embodiment of the present invention, the transformer-use magnetic member 24 and inductor-use magnetic member 34 are separately formed, it is possible to set the effective magnetic permeability of the transformer-use magnetic member 24 so as to be higher than the effective magnetic permeability of the inductor-use magnetic member 34 by, for example, making a difference between their structural materials. In the composite smoothing inductor 10 according to an embodiment of the present invention, accordingly, it is preferable each of the first smoothing inductor 30 and second smoothing inductor 40 to be structured not to have an air gap. When the first smoothing inductor 30 and second smoothing inductor 40 are structured in this way, even though the composite smoothing inductor 10 is downsized and the driving frequency becomes a high frequency, a problem attributable to a leakage magnetic field is less likely to occur.

Simulation results will be indicated below. In the smoothing inductor illustrated in FIG. 1, to drop an input voltage of 5 V to 1 V, the first switching element SW1 and second switching circuit SW2 were alternately operated at a frequency of 800 kHz and a pulse signal with a duty ratio of 0.21 was input to the composite smoothing inductor 10. Generated output signals were measured with different values of the mutual inductance Lm of the first transformer coil 23A and second transformer coil 23B and the self-inductance Lk of the first inductor coil 33 and second inductor coil 43. The self-inductance Lk of the first inductor coil 33 and the self-inductance Lk of the second inductor coil 43 were set so as to be equal.

When the mutual inductance Lm and self-inductance Lk are changed, the current waveform of the output signal from the output part OUT was varied as indicated in Table 1. In FIGS. 12 to 16, output signals (solid lines in the drawings) for result 1 to result 5 are indicated together with input signals (dashed lines in the drawings). As a basic tendency, when the mutual inductance Lm was increased, the ripple value of the current waveform (difference between the maximum value and the minimum value in amperes (A)) was reduced. R/P in Table 1 stands for a ripple value/peak current value (unit: %).

TABLE 1

| Lm (nH) | Lk (nH) | Lm/Lk | Peak current value (A) | Ripple value (A) | R/P |
|---|---|---|---|---|---|
| Result 1 | 200 | 65 | 3.08 | 28.8 | 7.6 | 26% |
| Result 2 | 0 | 65 | 0 | 33 | 17 | 52% |
| Result 3 | 0 | 150 | 0 | 28.5 | 7.2 | 25% |
| Result 4 | 65 | 65 | 1 | 29.5 | 10 | 34% |
| Result 5 | 400 | 65 | 6.15 | 28.5 | 6.9 | 24% |

In result 1, result 4, and result 5, current waveforms having two peaks in one cycle of a pulse signal were obtained, as illustrated in FIGS. 12, 15, and 16. The two peaks are composed of a peak directly based on the current of the pulse signal and a peak based on an inducted current. When the mutual inductance Lm is larger than the self-inductance Lk (result 1 and result 5), it was indicated that R/P becomes 30% or less and superior smoothing is performed. When the mutual inductance Lm is 0 nH (result 2 and result 3), however, a peak based on an inducted current was not recognized in the current waveform of the output signal, as illustrated in FIGS. 13 and 14.

As described above, in the composite smoothing inductor 10 according to an embodiment of the present invention, when a current flows in one of the first transformer coil 23A and second transformer coil 23B, in response to the current, the coupling transformer 20 flows a current in the other of the first transformer coil 23A and second transformer coil 23B, and causes each of the first smoothing inductor 30 and second smoothing inductor 40, which are connected to the coupling transformer 20, to accumulate electric energy. Since currents flow from both of the first smoothing inductor 30 and second smoothing inductor 40 with a phase delay, the input pulse signal is smoothed. Therefore, it is ideal that energy is not accumulated in the coupling transformer 20. In reality, however, energy is accumulated in the coupling transformer 20 as well due to various reasons, as explained next with reference to FIGS. 17A to 17C.

Figure 17A:
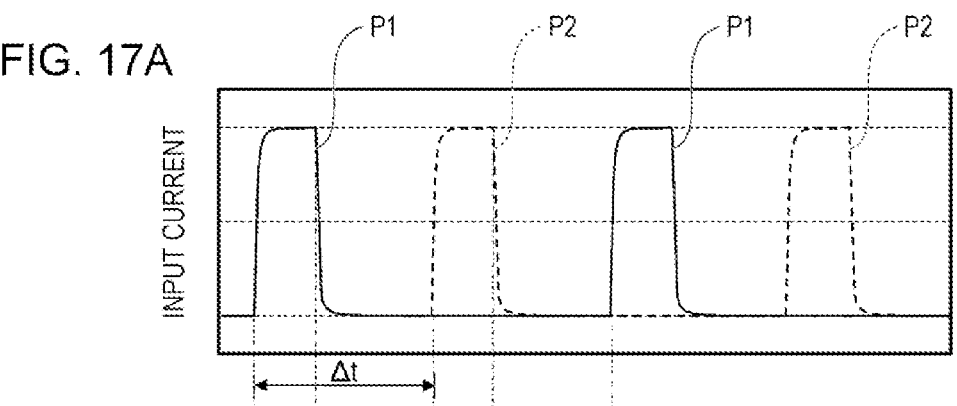
FIG. 17A illustrates a pulse signal (solid lines) to be input into the input terminal of a first transformer coil and a pulse signal (dashed lines) to be input into the input terminal of a second transformer coil.
Figure 17B:
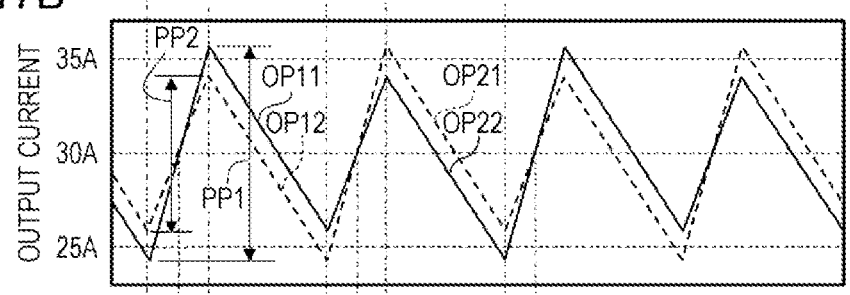
FIG. 17B illustrates a current (solid lines) flowing in the output part of a first smoothing inductor and a current (dashed lines) flowing in the output part of a second smoothing inductor.
Figure 17C:
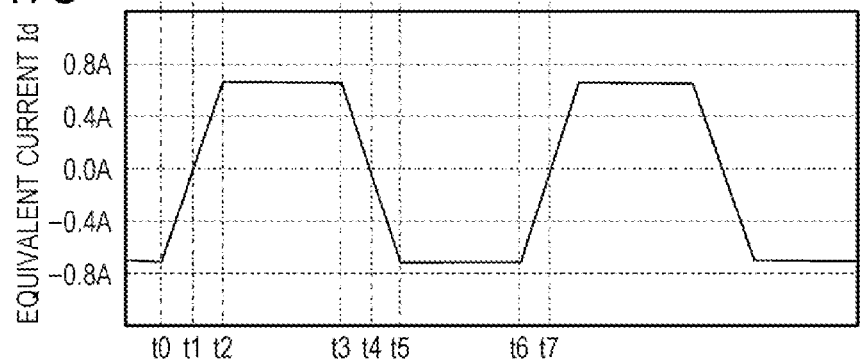
FIG. 17C illustrates a difference (equivalent current) between the two currents illustrated in FIG. 17B.

FIG. 17A illustrates a pulse signal (solid lines) to be input into the input terminal 11A of the first transformer coil 23A and a pulse signal (dashed lines) to be input into the input terminal 11B of the second transformer coil 23B. FIG. 17B illustrates a current (solid lines) flowing in the output part 32 of the first smoothing inductor 30 and a current (dashed lines) flowing in the output part 42 of the second smoothing inductor 40. FIG. 17C illustrates a difference between the two currents illustrated in FIG. 17B.

As illustrated in FIG. 1 and other drawings, since the composite smoothing inductor 10 according an embodiment of the present invention has a structure in which a smoothing inductor is connected to each transformer coil in the coupling transformer 20 in series, the mutual inductance Lm of the transformer coil and the self-inductance Lk of the smoothing inductor interact with each other. Therefore, there is no strict match between the waveform of a current that flows from the transformer coil into which the pulse signal has been input and proceeds in the smoothing inductor and the waveform of a current that flows from the transformer coil in which an induced current is generated in the coupling transformer 20 and proceeds in the smoothing inductor.

This point will be explained with reference to FIGS. 17A to 17C. When a pulse signal P1 is input into the input terminal 11A on the same side as the first transformer coil 23A as illustrated in FIG. 17A, a current flowing in the output part 32 of the first smoothing inductor 30 through the first transformer coil 23A and first smoothing inductor 30 becomes a signal with a triangular waveform OP11 illustrated in FIG. 17B. The induced current generated by the pulse signal P1 flowing in the first transformer coil 23A flows in the second smoothing inductor 40 and is output from the output part 42 of the second smoothing inductor 40 as a signal with a triangular waveform OP12 illustrated in FIG. 17B. There is a mismatch between the peak-to-peak current value (ripple current) PP1 of the triangular waveform OP11 and the ripple current PP2 of the triangular waveform OP12; the ripple current PP1 is larger than the ripple current PP22.

When a pulse signal P2 is input into the input terminal 11B on the same side as the second transformer coil 23B as illustrated in FIG. 17A, a triangular waveform OP21 having a ripple current similar to the ripple current PP1 of the triangular waveform OP11 is output from the output part 42 of the second smoothing inductor 40 connected to the second transformer coil 23B into which the pulse signal P2 is directly input and a triangular waveform OP22 having a ripple current similar to the ripple current PP2 of the triangular waveform OP12 is output from the output part 32 of the first smoothing inductor 30.

Therefore, when a pulse signal P1 and pulse signal P2 are periodically input into the coupling transformer 20 at equal intervals as illustrated in FIG. 17A, the triangular waveform of the ripple current PP1 and the triangular waveform of the ripple current PP2 are alternately output from each of the output part 32 of the first smoothing inductor 30 and the output part 42 of the second smoothing inductor 40 as illustrated in FIG. 17B. The repetitive phases of the triangular waveforms of the signal from the output part 32 of the first smoothing inductor 30 and the signal from the output part 42 of the second smoothing inductor 40 are inverted. As a result, therefore, a triangular waveform formed by a combination of the triangular waveform of the ripple current PP1 and the triangular waveform of the ripple current PP2 is repeatedly output from the output terminal 12 at an interval Δt between the transmission of a pulse signal P1 and the transmission of a pulse signal P2.

Since, as described above, there is a mismatch between the waveform of a current that flows from the transformer coil into which a pulse signal has been input and proceeds in the smoothing inductor and the waveform of a current that flows from the transformer coil in which an induced current is generated in the coupling transformer 20 and proceeds in the smoothing inductor, energy equivalent to a differential current between these current waveforms is accumulated in the coupling transformer 20. FIG. 17C illustrates a differential current obtained by subtracting the value of the current flowing in the output part 42 of the second smoothing inductor 40 from the value of the current flowing in the output part 32 of the first smoothing inductor 30. A relation in time among FIG. 17A to FIG. 17C is illustrated by dash-dot lines. In this description, the differential current described above is also referred to as the equivalent current Id.

As illustrated in FIGS. 17A and 17B, when the input of a pulse signal P1 starts at a certain time t0, the current (solid lines) flowing in the output part 32 of the first smoothing inductor 30 and the current (dashed lines) flowing in the output part 42 of the second smoothing inductor 40 become equal at time t1, which is a time at which a predetermined time elapsed from time t0, and the equivalent current Id illustrated in FIG. 17C becomes 0 A. The current (solid lines) flowing in the output part 32 of the first smoothing inductor 30 is higher than the current (dashed lines) flowing in the output part 42 of the second smoothing inductor 40 and the equivalent current Id is increased while having a positive value from time t1 to time t2, at which the pulse signal P1 stops. After that, the equivalent current Id at time t2 is maintained until time t3, at which the input of a pulse signal P2 into the second transformer coil 23B starts.

After time t3, at which the input of the pulse signal P2 into the second transformer coil 23B started, the second transformer coil 23B becomes an active circuit and the first transformer coil 23A becomes a passive circuit, so an increase in current in the output part 42 of the second smoothing inductor 40, which is electrically connected to the second transformer coil 23B, becomes relatively noticeable. At time t4, the current (solid lines) flowing in the output part 32 of the first smoothing inductor 30 and the current (dashed lines) flowing in the output part 42 of the second smoothing inductor 40 become equal. Subsequently, the current (dashed lines) flowing in the output part 42 of the second smoothing inductor 40 is higher than the current (solid lines) flowing in the output part 32 of the first smoothing inductor 30, so the equivalent current Id is increased while having a negative value until time t5, at which the pulse signal P2 stops. After that, the equivalent current Id at time t5 is maintained until time t6, at which a pulse signal P1 is input into the first transformer coil 23A. After time t6, at which the pulse signal P1 was input into the first transformer coil 23A, the first transformer coil 23A becomes an active circuit and the second transformer coil 23B becomes a passive circuit, so an increase in current in the output part 32 of the first smoothing inductor 30, which is electrically connected to the first transformer coil 23A, becomes relatively noticeable. At time t7, the current (solid lines) flowing in the output part 32 of the first smoothing inductor 30 and the current (dashed lines) flowing in the output part 42 of the second smoothing inductor 40 become equal. Since this state is equal to the state at time t1, a phenomenon from time t1 to time t7 repeatedly occurs after that.

As a result, the equivalent current Id has a waveform in which the positive side and negative side of a trapezoid alternate as illustrated in FIG. 17C, that is, the equivalent current Id is an alternate current. An induced magnetic field is generated according to the equivalent current Id that alternately flows in the coupling transformer 20, and the resulting energy causes an iron loss and becomes a cause of heat generation in the coupling transformer 20.

To study a method of reducing heat generation in the coupling transformer 20, a simulation was performed with different values of the mutual inductance Lm of the coupling transformer 20 and the self-inductances Lk of the first smoothing inductor 30 and second smoothing inductor 40 (the self-inductances Lk of the first smoothing inductor 30 and the self-inductances Lk of the second smoothing inductor 40 values were set to the same value). Results in the simulation are indicated in Table 2. Setting conditions in the simulation are as follows.

Input voltage: 12 V

Output voltage: 3.0 V

Duty ratio of pulse signal: 25%

Maximum current in each phase: 35 A

Coupling coefficient of coupling transformer: 0.996

TABLE 2

| | Lk (μH) | Lm (μH) | Lm/Lk ratio | Ripple current PP1 [A] | Ripple current PP2 [A] | Ripple current ratio PP2/PP1 | Maximum amplitude of equivalent current [A] | Accumulated energy Ek of smoothing inductor [μJ] | Accumulated energy Em in coupling transformer [μJ] | Leakage inductance of coupling transformer [nH] |
|---|---|---|---|---|---|---|---|---|---|---|
| Result 2-1 | 0.47 | 0 | 0.00 | 10.4 | — | — | — | 763.32 | — | 0.00 |
| Result 2-2 | 0.24 | 0.33 | 1.38 | 10.4 | 2.7 | 26.0% | 7.55 | 389.78 | 9.41 | 2.63 |
| Result 2-3 | 0.22 | 0.42 | 1.91 | 10.4 | 3.9 | 37.5% | 6.45 | 357.30 | 8.74 | 3.35 |
| Result 2-4 | 0.2 | 0.56 | 2.80 | 10.4 | 5.1 | 49.0% | 5.2 | 324.82 | 7.57 | 4.47 |
| Result 2-5 | 0.18 | 0.78 | 4.33 | 10.4 | 6.6 | 63.5% | 4 | 292.34 | 6.24 | 6.22 |
| Result 2-6 | 0.165 | 1.5 | 9.09 | 10.4 | 8.3 | 79.8% | 2.15 | 267.97 | 3.47 | 11.97 |
| Result 2-7 | 0.16 | 1.8 | 11.25 | 10.4 | 8.5 | 81.7% | 1.95 | 259.85 | 3.42 | 14.36 |
| Result 2-8 | 0.155 | 2.2 | 14.19 | 10.4 | 8.8 | 84.6% | 1.6 | 251.73 | 2.82 | 17.56 |
| Result 2-9 | 0.15 | 3 | 20.00 | 10.9 | 9.7 | 89.0% | 1.15 | 243.61 | 1.98 | 23.94 |

Figure 18:
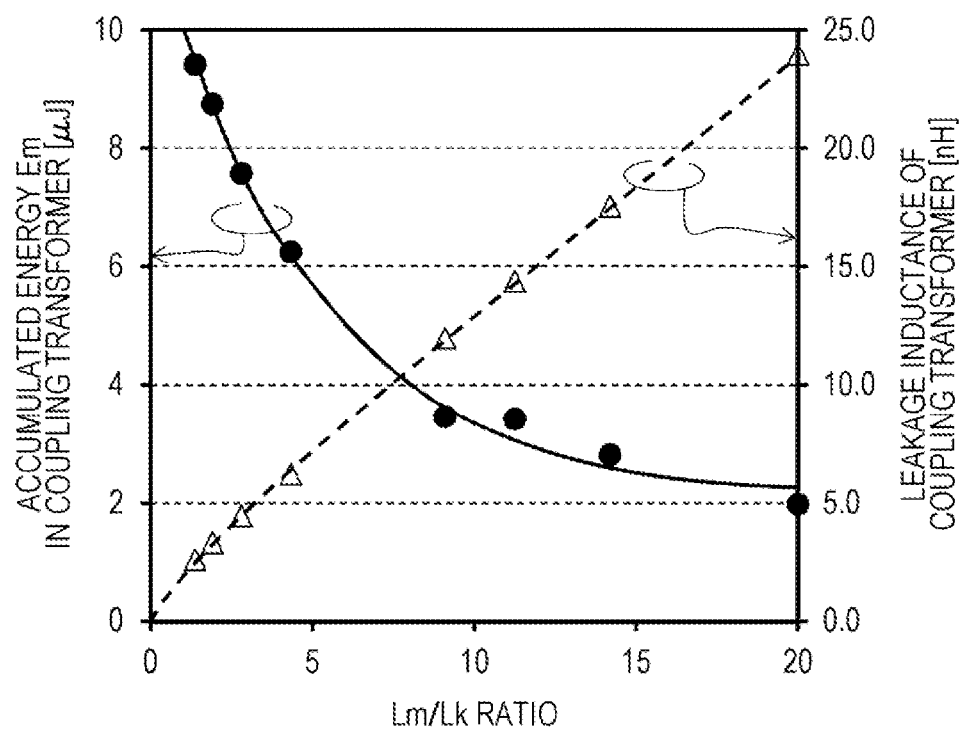
FIG. 18 is a graph illustrating results indicated in Table 2.

As indicated in Table 2 and FIG. 18, in which the results in the table are indicated as a graph, when the ratio (Lm/Lk ratio) of the mutual inductance Lm of the coupling transformer 20 to the self-inductance Lk of the first smoothing inductor 30 and second smoothing inductor 40 becomes large, the accumulated energy Em (unit: μJ) in the coupling transformer 20 tends to lower. When confirmed in detail, the accumulated energy Em in the coupling transformer 20 is largely reduced according to an increase in the Lm/Lk ratio until the Lm/Lk ratio reaches about 10. Therefore, the Lm/Lk ratio is preferably larger than 1, more preferably 2 or larger, still more preferably 5 or larger, and particularly preferably 8 or larger.

When the Lm/Lk ratio is about 10 or larger, the degree of the reduction in the accumulated energy Em in the coupling transformer 20 becomes small. When the Lm/Lk ratio is about 15 or larger, the extent of the effect of an increase in the Lm/Lk ratio on a decrease in the accumulated energy Em in the coupling transformer 20 is lowered. When the Lm/Lk ratio is increased, the leakage component (leakage inductance) of the coupling transformer 20 is substantially monotonously increased. An increase in the leakage component (leakage inductance) of the coupling transformer 20 brings about a reduction in energy transmissibility to the passive circuit of the coupling transformer 20 and finally brings about an increase in iron loss. Therefore, excessively increasing the Lm/Lk ratio is not preferable from the viewpoint of suppressing heat generation in the coupling transformer 20. Therefore, it is preferable to set the Lm/Lk ratio to 15 or smaller and more preferable to set it to 12 or smaller.

Figure 19A:
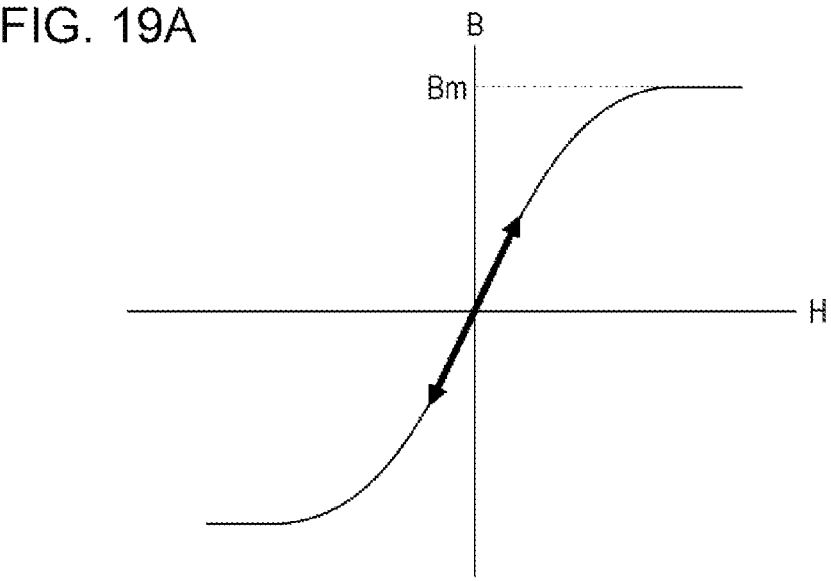
FIG. 19A is a graph conceptually illustrating a B-H curve of a coupling transformer in a case in which a positive-negative balance is taken when the equivalent current alternates.

In the above explanation, a case in which a positive-negative balance is taken when the equivalent current Id alternates has been described. In this case, the magnetic field generated by the equivalent current Id varies toward the positive side and negative side with respect to a zero magnetic field, as illustrated in FIG. 19A. FIG. 19A is a graph conceptually illustrating a B-H curve of the coupling transformer 20 in a case in which a positive-negative balance is taken when the equivalent current Id alternates. According to the alternation of the equivalent current Id, a magnetic field is generated in a range, indicated by the bold double-headed arrow, on the B-H curve. The main property demanded for a magnetic field used for the transformer-use magnetic member 24 is that magnetic permeability is high, as described above. From this viewpoint, ferrite is preferable. When, as illustrated in FIG. 19A, the magnetic field generated by the alternating equivalent current Id varies toward the positive side and negative side with respect to the zero magnetic field, even though the material has a relatively low saturation magnetic flux density like a ferrite-base material, a problem is less likely to occur.

In reality, however, the alternating equivalent current Id is not 0 A at the center of the alternation and is often shifted in the positive direction or negative direction. Although there are various reasons for this, specific examples include that, the direct-current resistance components of the first transformer coil 23A and second transformer coil 23B in the coupling transformer 20 differ, the direct-current resistance components of the first smoothing inductor 30 and second smoothing inductor 40 differ, and there are variations in the resistance component and the like between the circuit connected to the input terminal 11A of the composite smoothing inductor 10 and the circuit connected to the input terminal 11B within manufacturing tolerance or the like.

Figure 20A:
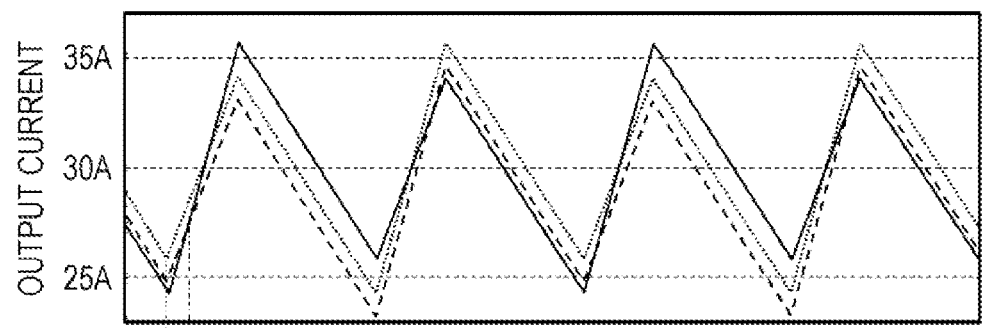
FIGS. 20A and 20B illustrate specific examples in a case in which a positive-negative balance is not taken when the equivalent current alternates; specifically.
Figure 20B:
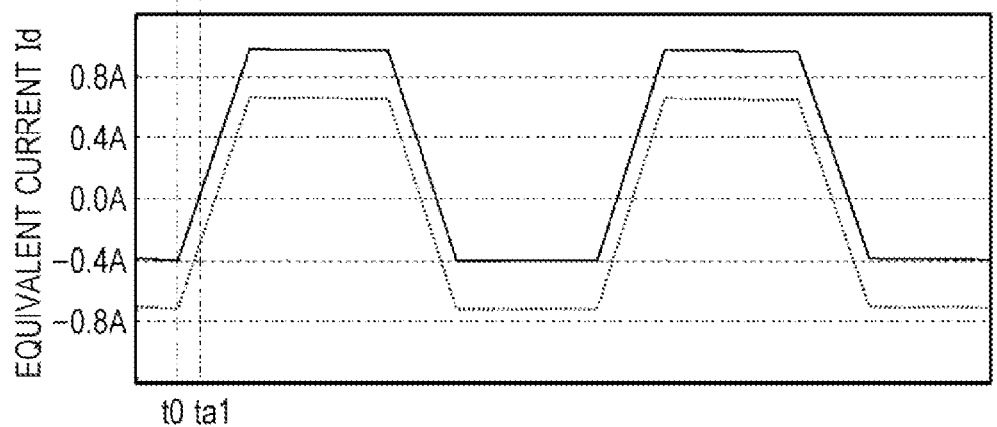

FIG. 20A and 20B illustrate specific example in a case in which a positive-negative balance is not taken when the equivalent current Id alternates; specifically, FIG. 20A illustrates a current (solid lines) flowing in the output part 32 of the first smoothing inductor 30, a current (dashed lines) flowing in the output part 42 of the second smoothing inductor 40, and the current (dotted lines), illustrated in FIG. 17B, flowing in the output part 42 of the second smoothing inductor 40, the current in FIG. 17B being indicated for comparison purposes, and FIG. 20B illustrates the equivalent current Id (solid lines) created from a difference between the two currents illustrated in FIG. 20A and the equivalent current Id (dotted lines) illustrated in FIG. 17C, the current in FIG. 17C being indicated for comparison purposes.

As illustrated in FIG. 20A, if the current (dashed lines) flowing in the output part 42 of the second smoothing inductor 40 becomes 1 A lower than the current (solid lines) flowing in the output part 32 of the first smoothing inductor 30 for some reason (an example of a reason is that a resistance component that is not originally necessary is connected in series), time ta1 at which the current (solid lines) flowing in the output part 32 of the first smoothing inductor 30 and the current (dashed lines) flowing in the output part 42 of the second smoothing inductor 40 become equal and the value of the equivalent current Id becomes 0 A is earlier than time t1 at which the value of the equivalent current Id illustrated in FIG. 17C becomes 0 A (time ta1 is close to time t0 at which a pulse signal P1 starts). Due to this, the waveform of the equivalent current Id is wholly shifted toward the positive side, as illustrated in FIG. 20B. As a result, the maximum value of the absolute value of the equivalent current Id is increased to about 0.9 A. By comparison, the maximum value of the absolute value of the equivalent current Id illustrated in FIG. 17C is about 0.6 A.

Figure 19B:
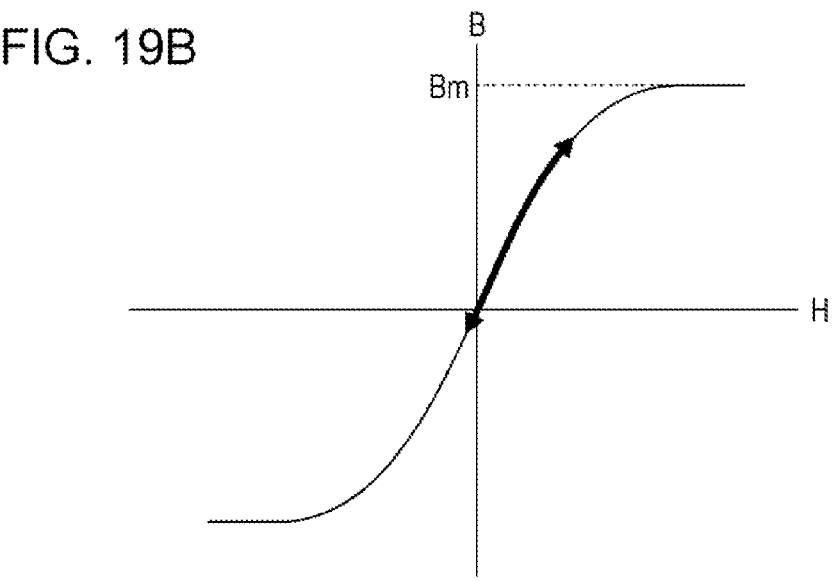
FIG. 19B is a graph conceptually illustrating a B-H curve of the coupling transformer in a case in which a positive-negative balance is not taken when the equivalent current alternates.

This change in the range of the equivalent current Id becomes prominent as a change in the range of the magnetic field generated by the equivalent current Id. That is, if the equivalent current Id is wholly shifted toward the positive side as described above, the range of the magnetic field generated in the coupling transformer 20 is shifted to the first quadrant on the B-H curve. FIG. 19B is a graph conceptually illustrating a B-H curve of the coupling transformer 20 in a case in which a positive-negative balance is not taken when the equivalent current Id alternates (specifically, the equivalent current Id is shifted toward the positive side). The magnetic field generated by the equivalent current Id reaches a region close to the saturation magnetic flux density Bm of the transformer-use magnetic material (a specific example is a ferrite-based material) of the transformer-use magnetic member 24 included in the coupling transformer 20, as indicated in the bold double-headed arrow in FIG. 19B. When this state is reached, the iron loss of the coupling transformer 20 is increased and heat generation from the coupling transformer 20 becomes noticeable. Therefore, it is preferable for the center value of the alternating equivalent current Id to be as close to 0 A as possible.

To reduce heat generation in the coupling transformer 20, it is of course preferable for the range of variations of the alternating equivalent current Id to be small. Specifically, the maximum value of magnetic flux density due to energy accumulated in the coupling transformer 20, that is, the maximum value of the absolute value of the induced magnetic field generated in the coupling transformer 20 by the equivalent current Id is preferably 50% or less of the saturation magnetic flux density of the transformer-use magnetic member 24 included in the coupling transformer 20, more preferably 40% or less, and particularly preferably 30% or less. If ferrite the saturation magnetic flux density of which is from about 380 mT to about 500 mT is taken as a specific example, the maximum value of the absolute value of the induced magnetic field generated in the coupling transformer 20 by the equivalent current Id is preferably 250 mT or less, more preferably 200 mT or less, and particularly preferably 140 mT or less.

The embodiment explained above has been described for easy understanding of the present invention and has not been described to limit the present invention. Therefore, each element disclosed in the above embodiment is intended to include all design changes and equivalents as well that belong to the technical range of the present invention.

For example, in the composite smoothing inductor 10 according to an embodiment of the present invention, the direction in which the first transformer coil 23A and second transformer coil 23B have overlapped each other (direction of the cross axis) is along the thickness direction of the substrate 50, but the direction may be along an in-plane direction on a main plane of the substrate 50.

Moreover, the first-inductor-use magnetic member in the first smoothing inductor 30 and the second-inductor-use magnetic member in the second smoothing inductor 40 have been integrated together and form the inductor-use magnetic member 34, but these magnetic members may be separately formed. In this case, the first-inductor-use magnetic material of the first-inductor-use magnetic member and the second-inductor-use magnetic material of the second-inductor-use magnetic member may be the same material or may be different materials. There is a case in which, from the viewpoint of suppressing heat generation from the coupling transformer 20, it is preferable for these materials to be the same and for the magnetic property of the first-inductor-use magnetic member and the magnetic property of the second-inductor-use magnetic member to be almost equal.

A smoothing circuit having the smoothing inductor according to an embodiment of the present invention can be preferably used as a partial circuit in a DC-DC converter. The smoothing circuit can also be preferably used not only in a step-down converter but also in a step-up converter, an output smoothing circuit in an insulation-type converter that operates in multiple phases, a rectifying circuit of a current doubler type, and the like.

What is claimed is:

1. A composite smoothing inductor comprising:
   a coupling transformer having two input parts and two output parts;
   a first smoothing inductor having one input part and one output part;
   a second smoothing inductor having one input part and one output part;
   two input terminals;
   an output terminal; and
   a substrate on which the one coupling transformer, the first smoothing inductor, the second smoothing inductor, the two input terminals, and one output terminal are placed in a concentrated manner; wherein
   one of the two input terminals is connected to one of the two input parts of the coupling transformer, and another of the two input terminals is connected to another of the two input parts of the coupling transformer,
   one of the two output parts of the coupling transformer is connected to the input part of the first smoothing inductor, and another of the two output parts of the coupling transformer is connected to the input part of the second smoothing inductor,
   the output part of the first smoothing inductor and the output part of the second smoothing inductor are each connected to the one output terminal, and
   a mutual inductance of the coupling transformer is higher than a self-conductance of the first smoothing inductor and a self-conductance of the second smoothing inductor.

2. The composite smoothing inductor according to claim 1, wherein a ratio of a mutual inductance of the coupling transformer to a self-inductance of the first smoothing inductor and a ratio of a mutual inductance of the coupling transformer to a self-inductance of the second smoothing inductor are larger than 1 and 12 or smaller.

3. The composite smoothing inductor according to claim 1, wherein:
   the coupling transformer has a first transformer coil, a second transformer coil, and a transformer-use magnetic member, which internally includes at least part of the first transformer coil and at least part of the second transformer coil;
   the first smoothing inductor has a first inductor coil and a first-inductor-use magnetic member, which internally includes at least part of the first inductor coil;
   the second smoothing inductor has a second inductor coil and a second-inductor-use magnetic member, which internally includes at least part of the second inductor coil;
   an effective magnetic permeability of the transformer-use magnetic member is higher than an effective magnetic permeability of the first-inductor-use magnetic member and an effective magnetic permeability of the second-inductor-use magnetic member; and
   a saturation magnetic flux density of a transformer-use magnetic material of the transformer-use magnetic member is lower than a saturation magnetic flux density of a first-inductor-use magnetic material of the first-inductor-use magnetic member and a saturation magnetic flux density of a second-inductor-use magnetic material of the second-inductor-use magnetic member.

4. The composite smoothing inductor according to claim 3, wherein a magnetic flux density due to energy accumulated in the coupling transformer is 50% or less of the saturation magnetic flux density of the transformer-use magnetic material of the transformer-use magnetic member.

5. The composite smoothing inductor according to claim 3, wherein:
   the effective magnetic permeability of the transformer-use magnetic member is 1000 or more and 3500 or less; and
   the effective magnetic permeability of the first-inductor-use magnetic member and the effective magnetic permeability of the second-inductor-use magnetic member are each 15 or more and 120 or less.

6. The composite smoothing inductor according to claim 3, wherein:
   the saturation magnetic flux density of the transformer-use magnetic material of the transformer-use magnetic member is 380 mT or more and 520 mT or less; and
   the saturation magnetic flux density of the first-inductor-use magnetic material of the first-inductor-use magnetic member and the saturation magnetic flux density of the second-inductor-use magnetic material of the second-inductor-use magnetic member are each 700 mT or more.

7. The composite smoothing inductor according to claim 3, wherein a conductive part of the first transformer coil and a conductive part of the second transformer coil each have a portion placed so that the portion of the conductive part of the first transformer coil and the portion of the conductive part of the second transformer coil come into contact with each other through a member formed from an insulting material.

8. The composite smoothing inductor according to claim 3, wherein the first transformer coil and the second transformer coil are each composed of a conductor and an insulating part that covers a surface of the conductive part and each have a portion placed so that the insulating part of the first transformer coil and the insulating part of the second transformer coil come into contact with each other.

9. The composite smoothing inductor according to claim 3, wherein:
   the first transformer coil and the second transformer coil each have a crossing section; and the crossing section of the first transformer coil and the crossing section of the second transformer coil mutually cross in the transformer-use magnetic member an odd number of times.

10. The composite smoothing inductor according to claim 9, wherein:
the first smoothing inductor and the second smoothing inductor are placed side by side along a first direction, which is one of in-plane directions on a main plane of the substrate;
and
the coupling transformer and a group of smoothing inductors composed of the first smoothing inductor and the second smoothing inductor are placed side by side in a second direction crossing the first direction in the main plane of the substrate.

11. The composite smoothing inductor according to claim 10, wherein the first-inductor-use magnetic member and the second-inductor-use magnetic member are integrated together.

12. The composite smoothing inductor according to claim 11, wherein the first inductor coil and the second inductor coil are placed so that a magnetic field generated by a current flowing in the first inductor coil and a magnetic field generated by a current flowing in the second inductor coil do not magnetically coupled.

13. The composite smoothing inductor according to claim 1, wherein the first smoothing inductor does not have an air gap.

14. The composite smoothing inductor according to claim 1 to, wherein the second smoothing inductor does not have an air gap.

15. A smoothing circuit comprising:
a first switching element;
a second switching element;
a composite smoothing inductor comprising:
  a coupling transformer having two input parts and two output parts;
  a first smoothing inductor having one input part and one output part;
  a second smoothing inductor having one input part and one output part;
  two input terminals;
  an output terminal; and
  a substrate on which the one coupling transformer, the first smoothing inductor, the second smoothing inductor, the two input terminals, and one output terminal are placed in a concentrated manner; wherein
one of the two input terminals is connected to one of the two input parts of the coupling transformer, and another of the two input terminals is connected to another of the two input parts of the coupling transformer,
one of the two output parts of the coupling transformer is connected to the input part of the first smoothing inductor, and another of the two output parts of the coupling transformer is connected to the input part of the second smoothing inductor,
the output part of the first smoothing inductor and the output part of the second smoothing inductor are each connected to the one output terminal, and
a mutual inductance of the coupling transformer is higher than a self-conductance of the first smoothing inductor and a self-conductance of the second smoothing inductor; and
a capacitor; wherein
a pulse signal output from the first switching element is connected to one of the two input terminals of the composite smoothing inductor so that the pulse signal is capable of being input, and a pulse signal output from the second switching circuit is connected to the other of the two input terminals of the composite smoothing inductor so that the pulse signal is capable of being input, and
the capacitor is connected to the one output terminal of the composite smoothing inductor, and a smoothed signal is capable of being output from an output part provided between the capacitor and the one terminal of the composite smoothing inductor.

* * * * *